United States Patent
Fu et al.

(10) Patent No.: US 12,556,991 B2
(45) Date of Patent: Feb. 17, 2026

(54) CELL RESELECTION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 325 days.

(21) Appl. No.: 18/092,223

(22) Filed: Dec. 31, 2022

(65) Prior Publication Data

US 2023/0209426 A1 Jun. 29, 2023

Related U.S. Application Data

(63) Continuation of application No. PCT/CN2020/102408, filed on Jul. 16, 2020.

(51) Int. Cl.
H04W 36/08 (2009.01)
H04W 36/00 (2009.01)

(52) U.S. Cl.
CPC ....... *H04W 36/08* (2013.01); *H04W 36/0061* (2013.01)

(58) Field of Classification Search
CPC . H04W 36/08; H04W 36/0061; H04W 48/20; H04W 48/18
See application file for complete search history.

(56) References Cited

U.S. PATENT DOCUMENTS

| | | |
|---|---|---|
| 12,207,207 B2 | 1/2025 | Kim et al. |
| 2018/0324602 A1 | 11/2018 | Griot et al. |
| 2019/0289528 A1 | 9/2019 | Lou et al. |
| 2020/0120547 A1* | 4/2020 | Han ................. H04W 36/0083 |
| 2021/0136675 A1 | 5/2021 | Lee et al. |
| 2022/0225189 A1 | 7/2022 | Kang et al. |

(Continued)

FOREIGN PATENT DOCUMENTS

| | | |
|---|---|---|
| CN | 102026310 A | 4/2011 |
| CN | 107197486 A | 9/2017 |

(Continued)

OTHER PUBLICATIONS

Qualcomm Incorporated, "Consideration of slicing in cell reselection", R2-1803581, 3GPP TSG-RAN WG2 Meeting #101 Athens, Greece, Feb. 26-Mar. 2, 2018.

(Continued)

*Primary Examiner* — Sun Jong Kim
(74) *Attorney, Agent, or Firm* — BAYES PLLC

(57) ABSTRACT

A method for cell reselection includes: performing, by a terminal device, cell reselection according to first information; where the first information includes at least one of: network slice information of the terminal device, frequency point priority information, and channel quality information of at least one cell, the frequency point priority information is used for indicating priority information of a frequency point or a cell, and the at least one cell comprises a serving cell and/or a neighboring cell of the terminal device.

18 Claims, 3 Drawing Sheets

(56) References Cited

U.S. PATENT DOCUMENTS

| | | | |
|---|---|---|---|
| 2022/0303871 A1 | 9/2022 | Chen et al. | |
| 2022/0338135 A1 | 10/2022 | Kim et al. | |
| 2023/0056855 A1* | 2/2023 | Jiang | H04W 36/0072 |
| 2023/0156583 A1 | 5/2023 | Murray et al. | |
| 2023/0189187 A1* | 6/2023 | Velev | H04W 48/16 |
| | | | 455/435.1 |
| 2023/0209453 A1 | 6/2023 | Mallick et al. | |
| 2023/0239774 A1 | 7/2023 | Fu et al. | |
| 2023/0254745 A1 | 8/2023 | Fujishiro | |
| 2023/0300738 A1 | 9/2023 | Liu | |
| 2024/0064587 A1 | 2/2024 | Sun et al. | |
| 2024/0073761 A1 | 2/2024 | Fu et al. | |
| 2024/0121710 A1 | 4/2024 | Cheng et al. | |
| 2024/0224144 A1 | 7/2024 | Ishii | |

FOREIGN PATENT DOCUMENTS

| | | |
|---|---|---|
| CN | 107223350 A | 9/2017 |
| CN | 108366365 A | 8/2018 |
| CN | 108738096 A | 11/2018 |
| CN | 109246775 A | 1/2019 |
| CN | 109309939 A | 2/2019 |
| CN | 109565451 A | 4/2019 |
| CN | 109862579 A | 6/2019 |
| CN | 110831100 A | 2/2020 |
| CN | 111050373 A | 4/2020 |
| CN | 111149387 A | 5/2020 |
| CN | 111386727 A | 7/2020 |
| CN | 111770517 A | 10/2020 |
| CN | 111866991 A | 10/2020 |
| CN | 109923903 B | 2/2021 |
| CN | 113016210 A | 6/2021 |
| CN | 109246775 B | 9/2021 |
| CN | 110784897 B | 12/2021 |
| EP | 3589016 A1 | 1/2020 |
| EP | 3611968 A1 | 2/2020 |
| EP | 3627863 A1 | 3/2020 |
| EP | 3863334 A1 | 8/2021 |
| EP | 4096292 A1 | 11/2022 |
| EP | 4195778 A1 | 6/2023 |
| JP | 2019110552 A | 7/2019 |
| WO | 2014069890 A1 | 5/2014 |
| WO | 2017157118 A1 | 9/2017 |
| WO | 2018195825 A1 | 11/2018 |
| WO | 2020088649 A1 | 5/2020 |
| WO | 2020097845 A1 | 5/2020 |
| WO | 2021146852 A1 | 7/2021 |

OTHER PUBLICATIONS

International Search Report issued in International application No. PCT/CN2020/102408, mailed Apr. 7, 2021.
Written Opinion of the International Searching Authority issued in International application No. PCT/CN2020/102408, mailed Apr. 8, 2021.
3GPP TS 38.304 V16.0.0 (Mar. 2020); Technical Specification Group Radio Access Network; NR; User Equipment (UE) procedures in Idle mode and RRC Inactive state (Release 16).
3GPP TS 38.304 V17.1.0 (Jun. 2022); Technical Specification Group Radio Access Network; NR; User Equipment (UE) procedures in Idle mode and RRC Inactive state (Release 17).
3GPP TS 38.331 V17.1.0 (Jun. 2022); Technical Specification Group Radio Access Network; NR; Radio Resource Control (RRC) protocol specification (Release 17).
Extended European Search Report issued in corresponding European application No. 20945213.5, mailed Jul. 5, 2023.
3GPP TSG-RAN WG2 Meeting#101bis Sanya, China, Apr. 16-20, 2018; R2-1804453; Source: ZTE, Sanechips; Title: Service based cell reselection in idle mode and inactive state.
First Office Action issued in corresponding European application No. 20945213.5, mailed Dec. 22, 2023.
Second Office Action issued in corresponding European application No. 20945213.5, mailed Jun. 25, 2024.
First Office Action issued in corresponding Chinese application No. 202080098547.3, mailed Jul. 26, 2024.
First Office Opinion Notice issued in corresponding Chinese Application No. 202310494034.X, mailed on Aug. 24, 2024, 26 pages.
Second Examination Opinion Notice issued in corresponding Chinese Application No. 202310494034.X, mailed Oct. 31, 2024, 24 pages.
Notice of Priority Examination of Patent Application issued in corresponding Chinese Application No. 202310494034.X, mailed Jul. 31, 2024, 6 pages.
Supplementary European Search Report issued in corresponding European Application No. 20943799.5, mailed Jul. 5, 2023, 11 pages.
Slice based cell reselection, Agenda Item: 10.2.11, Source: Intel Corporation, 3GPP TSG-RAN WG2 Meeting #101, R2-1802958, Athens, Greece, Feb. 26-Mar. 2, 2018, 3 pages.
Notice of Reasons for Refusal issued in corresponding Japanese Application No. 2022-581661, dated Apr. 19, 2024, 17 pages.
Slice Availability for Cell (Re-)Selection, Agenda item: 10.2.12, Source: Huawei, HiSilicon, 3GPP TSG-RAN WG2#99 R2-1708927, Berlin, Germany, Aug. 21-25, 2017, 4 pages.
Non-final Office action issued in corresponding U.S. Appl. No. 18/090,568, mailed on Apr. 10, 2025, 60 pages.
International Search Report issued in corresponding International Application No. PCT/CN2020/099428, dated Jan. 6, 2022, 29 pages.
International Search Report issued in corresponding International Application No. PCT/CN2020/119693 dated Apr. 7, 2022, 32 pages.
International Search Report issued in corresponding International Application No. PCT/CN2021/105599 dated Jan. 12, 2023, 38 pages.
First Office Action issued in corresponding European Application No. 20943799.5, mailed on Mar. 15, 2024, 6 pages.
Second Office Action issued in corresponding European Application No. 20943799.5, mailed on Sep. 26, 2024, 10 pages.
Summons to attend oral proceedings pursuant to Rule 115(1) EPC, issued in corresponding European Application No. 20943799.5, mailed on May 22, 2025, 41 pages.
First Examination Report issued in corresponding India Application No. 202327004008, mailed on Nov. 29, 2023, 5 pages.
Hearing Notice issued in corresponding India Application No. 202327004008, mailed on Aug. 22, 2024, 2 pages.
Supplementary European Search Report issued in corresponding European Application No. 20955802.2, mailed on Sep. 22, 2023, 10 pages.
Supplementary European Search Report issued in corresponding European Application No. 21948892.1 mailed on Jun. 12, 2024, 13 pages.
First Office Action issued in corresponding European Application No. 21948892.1, mailed on Mar. 21, 2025, 9 pages.
PCT Written Opinion of the International Searching Authority issued in corresponding International Application No. PCT/CN2020/099428, mailed on Mar. 26, 2021, 6 pages.
3rd Generation Partnership Project; Technical Specification Group Services and System Aspects; System architecture for the 5G System (5GS); Stage 2 (Release 17), 3GPP TS 23.501 V17.5.0 (Jun. 2022), 558 pages.
Slice specific cell reselection, Agenda item: 8.8.2, Source: Nokia, Nokia Shanghai Bell, 3GPP TSG-RAN WG2 Meeting #114 Electronic R2-2105240, May 19-27, 2021, 9 pages.
Cell selection and re-selection based on slice, Agenda Item: 10.2.12, Source: CATT, 3GPP TSG-RAN WG2 #99 R2-1707893, Berlin, Germany, Aug. 21-25, 2017, 2 pages.
Change Request, Corrections to TS 38.331 for RAN slicing, Huawei, HiSilicon (Rapporteur), 3GPP TSG-RAN WG2 Meeting #118-e R2-2206172, Electronic, May 9-20, 2022, 1198 pages.
Summary of [AT114-e][250][Slicing] Usage of slice priorities for cell, Source: Lenovo, Motorola Mobility (Rapporteur), 3GPP TSG-RAN WG2 Meeting #114 e R2-2106501, E-Meeting, May 19-27, 2021, 31 pages.

(56) References Cited

OTHER PUBLICATIONS

Change Request, 38.304 CR Corrections on slice-based cell reselection, NEC, 3GPP TSG-RAN WG2 Meeting #118e R2-2206845, Electronic meeting, May 9-20, 2022, 13 pages.
Cell Reselection Based on Slice Availability, Agenda Item: 10.2.11, Source: CATT, 3GPP TSG-RAN WG2 Meeting #101 R2-1801826, Athens, Greece, Feb. 26-Mar. 2, 2018, 3 pages.
3rd Generation Partnership Project; Technical Specification Group Radio Access Network; NR; Radio Resource Control (RRC) protocol specification (Release 16), 3GPP Ts 38.331 V16.1.0 (Jul. 2020), 906 pages.
3rd Generation Partnership Project; Technical Specification Group Radio Access Network; NR; User Equipment (UE) procedures in Idle mode and RRC Inactive state (Release 16), 3GPP TS 38.304 V16.3.0 (Dec. 2020), 39 pages.
First Office action issued in corresponding Chinese Applciation No. 202310549462.8, mailed on Sep. 11, 2025, 26 pages.
Non-final Office action issued in corresponding U.S. Appl. No. 18/128,706, mailed on Sep. 15, 2025, 38 pages.
PCT Written Opinion of the International Searching Authority issued in corresponding International Application No. PCT/CN2020/119693, mailed on May 26, 2021, 9 pages.
PCT Written Opinion of the International Searching Authority issued in corresponding International Application No. PCT/CN2021/105599, mailed on Feb. 25, 2022, 7 pages.
Third Office Action issued in corresponding Chinese Application No. 202080098547.3, mailed on Apr. 30, 2025, 23 pages.
Second Office Action issued in corresponding Chinese Application No. 202080098547.3, dated Dec. 31, 2024, 22 pages.
Communication pursuant to Article 94(3) EPC issued in corresponding European Application No. 20945213.5, dated Jan. 2, 2025, 10 pages.
First Office action issued in corresponding Korean Application No. 10-2023-7002498, mailed on Sep. 30, 2025, 12 pages.
Final Rejection issued in corresponding U.S. Appl. No. 18/090,568, mailed on Nov. 13, 2025, 50 pages.
Result of Consultation issued in corresponding European Application No. 20943799.5, mailed on Nov. 14, 2025, 10 pages.
Non-final Office action issued in corresponding U.S. Appl. No. 18/387,246, mailed on Dec. 4, 2025, 34 pages.

\* cited by examiner

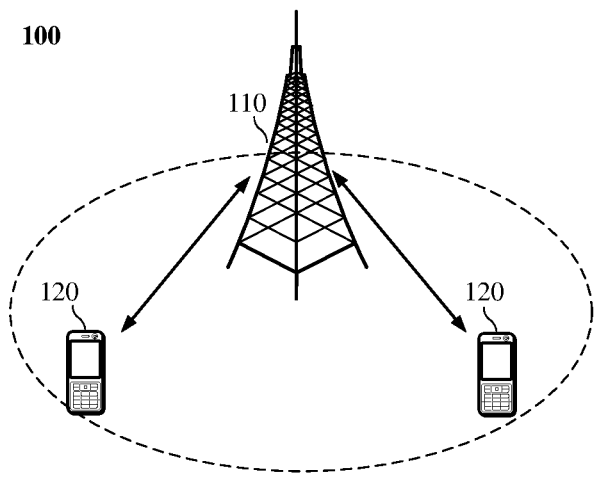

A terminal device performs cell reselection according to first information, wherein the first information comprises at least one of network slice information of the terminal device, frequency point priority information, and channel quality information of at least one cell; the frequency point priority information is used to indicate priority information of a frequency point or a cell; and the at least one cell comprises a serving cell and/or a neighboring cell of the terminal device — S210

Send, by the network device, second information to the terminal device, where the second information is used for indicating information related to a network slice, and the second information is used for the terminal device to perform cell reselection — S310

FIG. 3

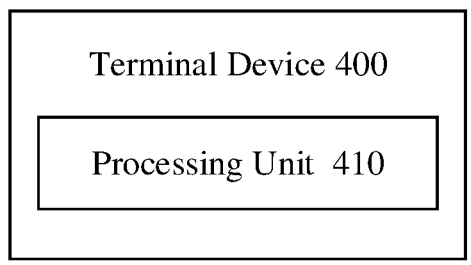

FIG. 4

CELL RESELECTION METHOD, TERMINAL DEVICE, AND NETWORK DEVICE

CROSS-REFERENCE TO RELATED APPLICATION

This application is a continuation of PCT application No. PCT/CN2020/102408, filed Jul. 16, 2020, entitled "CELL RESELECTION METHOD, TERMINAL DEVICE, AND NETWORK DEVICE," which is hereby incorporated by reference in its entirety.

TECHNICAL FIELD

Embodiments of this application relate to the field of communications, and in particular, to a method, a terminal device, and a network device for cell reselection.

BACKGROUND

In the 5G system, a network architecture of network slice (NS) is proposed to cope with the differences in user requirements. Specifically, different network handovers can support different types of services.

In the related art, the terminal device can perform cell reselection based on the cell reselection measurement criterion and the cell reselection criterion. When the cell reselection is performed based on the above-mentioned criteria, the terminal device will reselect a cell with high channel quality. However, if the service of the terminal device is related to network slice, the cell reselection performed according to the above criteria may affect the service transmission of the terminal device and affect the user experience.

SUMMARY

Embodiments of this application provide a method and a terminal device for cell reselection, which are conducive to reselection to a cell that meets the network slicing requirement of the terminal device, thereby improving user experience.

A first aspect provides a method for cell reselection, including: performing, by a terminal device, cell reselection according to first information; wherein the first information includes at least one of: network slice information of the terminal device, frequency point priority information, and channel quality information of at least one cell, the frequency point priority information is used for indicating priority information of a frequency point or a cell, and the at least one cell includes a serving cell and/or a neighboring cell of the terminal device.

A second aspect provides a method for cell reselection, including: sending, by a network device, second information to a terminal device, wherein the second information is used for indicating information related to a network slice, and the second information is used for the terminal device to perform cell reselection.

A third aspect provides a terminal device, configured to perform the method according to the first aspect or any possible implementation manner of the first aspect. Specifically, the terminal device includes a unit configured to perform the method according to the first aspect or any possible implementation manner of the first aspect.

A fourth aspect provides a network device, configured to perform the method according to the second aspect or any possible implementation manner of the second aspect. Specifically, the network device includes a unit configured to perform the method according to the second aspect or any possible implementation manner of the second aspect.

A fifth aspect provides a terminal device, where the terminal device includes a processor and a memory. The memory is used for storing a computer program, and the processor, when calling and running the computer program stored in the memory, is configured to perform the method according to the first aspect or any possible implementation manner thereof.

A sixth aspect provides a network device, where the network device includes a processor and a memory. The memory is used for storing a computer program, and the processor, when calling and running the computer program stored in the memory, is configured to perform the method according to the second aspect or any possible implementation manner thereof.

A seventh aspect provides a chip, configured to perform the method according to any of the first and second aspects or any possible implementation manner thereof.

Specifically, the chip includes: a processor, configured to invoke and run a computer program from a memory, thereby causing a device installed with the chip to perform the method according to any of the first and second aspects or any possible implementation manner thereof.

An eighth aspect provides a computer-readable storage medium used for storing a computer program, where the computer program causes a computer to perform the method according to any of the first and second aspects or any possible implementation manner thereof.

A ninth aspect provides a computer program product including computer program instructions, where the computer program instructions cause a computer to perform the method according to any of the first and second aspects or any possible implementation manner thereof.

A tenth aspect provides a computer program which, when running on a computer, causes the computer to perform the method according to any of the first and second aspects or any possible implementation manner thereof.

Based on the above technical solutions, during cell reselection, the terminal device can perform evaluation for cell reselection based on the network slice information of the terminal device, the frequency point priority information and the channel quality of the cell, which is conducive to reselecting a cell with desirable channel quality and meeting the network slicing requirement of the terminal device, thereby improving the user experience.

BRIEF DESCRIPTION OF THE DRAWINGS

FIG. 1 is a schematic diagram of an application scenario according to some embodiments of this application.

FIG. 2 is a schematic diagram of a method for cell reselection according to some embodiments of this application.

FIG. 3 is a schematic diagram of a method for cell reselection according to some other embodiments of this application.

FIG. 4 is a block diagram of a terminal device according to some embodiments of this application.

DETAILED DESCRIPTION

Figure 5:
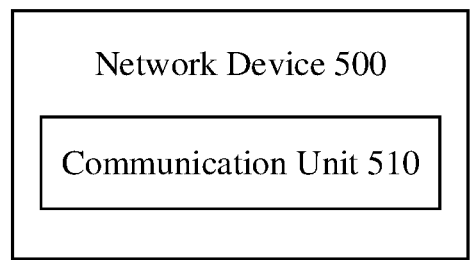
FIG. 5 is a block diagram of a network device according to some embodiments of this application.

The technical solutions in some embodiments of this application will be described below with reference to the accompanying drawings according to some embodiments of this application. Obviously, the described embodiments are part of the embodiments of this application, not all of them. With regard to the embodiments described in this application, all other embodiments obtained by those skilled in the art without creative efforts shall fall within the protection scope of this application.

The technical solutions of some embodiments of this application can be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a New Radio (NR) system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), Wireless Local Area Networks (WLAN), Wireless Fidelity (WiFi), a 5th-Generation (5G) system or other communication systems.

Generally speaking, traditional communication systems support a limited number of connections and are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, and the like, the embodiments of this application can also be applied to these communication systems.

Optionally, the communication system in some embodiments of this application may be applied to a carrier aggregation (CA) scenario, a dual connectivity (DC) scenario, or a standalone (SA) networking scenario.

Optionally, the communication system in some embodiments of this application may be applied to an unlicensed spectrum, where the unlicensed spectrum may also be considered as a shared spectrum. Alternatively, the communication system in some embodiments of this application may also be applied to a licensed spectrum, where, the licensed spectrum may also be considered unshared spectrum.

Some embodiments of this application are described in conjunction with embodiments of network device and terminal device, where the terminal device may also be referred to as user equipment (UE), access terminal, subscriber unit, subscriber station, mobile station, mobile site, remote station, remote terminal, mobile device, user terminal, terminal, wireless communication device, user agent, user device, or the like.

The terminal device may be a station (ST) in the WLAN, or may be a cellular phone, a cordless phone, a Session Initiation Protocol (SIP) phone, a wireless local loop (WLL) station, a Personal Digital Assistant (PDA) device, a handheld device with wireless communication capabilities, a computing device or other processing devices connected to a wireless modem, an in-vehicle device, a wearable device, a terminal device in the next-generation communication system such as the NR network, or may be a terminal device in the evolved public land mobile network (PLMN), or the like.

In some embodiments of this application, the terminal device may be deployed on land, including indoor or outdoor, handheld, wearable, or vehicle-mounted; may also be deployed on water (e.g., ships and the like); and may also be deployed in the air (e.g., airplanes, balloons, satellites and the like).

In some embodiments of this application, the terminal device may be a mobile phone, a tablet computer (pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example without limitation, in some embodiments of this application, the terminal device may also be a wearable device. Wearable devices may also be called wearable smart devices, which are the general term for the intelligent design of daily wear and the development of wearable devices using wearable technology, such as glasses, gloves, watches, clothing and shoes. A wearable device is a portable device that is worn directly on the body or integrated into the user's clothing or accessories. Wearable device is not only a hardware device, but also realizes powerful functions through software support, data interaction, and cloud interaction. In a broad sense, wearable smart devices include full-featured, large-scale, complete or partial functions without relying on smart phones, such as smart watches or smart glasses. Alternatively, wearable smart devices may only focus on a certain type of application function, which needs to cooperate with other devices such as smart phones for use, for example, various kinds of smart bracelets, smart jewelry and the like for physical sign monitoring.

In some embodiments of this application, the network device may be a device for communicating with a mobile device, and the network device may be an access point (AP) in WLAN, or a Base Transceiver Station (BTS) in GSM or CDMA; it may also be a NodeB (NB) in WCDMA, or an Evolutional Node B (eNB or eNodeB) in LTE, or a relay station or access point, in-vehicle equipment, wearable devices, a network device (gNB) in the NR network, or a network device in the future evolutional PLMN network, or a network device in the NTN network, or the like.

As an example without a limitation, in some embodiments of this application, the network device may have a mobile feature. For example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Optionally, the network device may also be a base station set in a fixed location such as land or water.

In some embodiments of this application, the network device may provide services for a cell, and a terminal device communicates with the network device through transmission resources (e.g., frequency domain resources, or spectrum resources) used by the cell, and the cell may correspond to a network device (e.g., base station), it may belong to a macro base station, or it may belong to a base station corresponding to a small cell. The small cell may include a metro cell, a micro cell, a pico cell, a femto cell, or the like. These small cells have the characteristics of small coverage and low transmission power, and are suitable for providing high-speed data transmission services.

Exemplarily, a communication system 100 to which some embodiments of this application is applied is shown in FIG. 1. The communication system 100 may include a network device 110, and the network device 110 may be a device that communicates with a terminal device 120 (or referred to as a communication terminal, a terminal). The network device 110 may provide communication coverage for a particular geographic area, and may communicate with terminal devices located within the coverage area.

FIG. 1 exemplarily shows one network device and two terminal devices. Optionally, the communication system 100 may include multiple network devices and the coverage of each network device may include other numbers of terminal devices. Embodiments of this application are not limited thereto.

Optionally, the communication system 100 may further include other network entities such as a network controller and a mobility management entity, which are not limited in the embodiments of this application.

It should be understood that, in some embodiments of this application, a device having a communication function in the network/system may be referred to as a communication device. Taking the communication system 100 shown in FIG. 1 as an example, the communication device may include the network device 110 and the terminal device 120 with a communication function, and the network device 110 and the terminal device 120 may be the specific devices described above, which will not be repeated here. The communication device may also include other devices in the communication system 100, for example, other network entities such as a network controller, a mobility management entity, or the like, which are not limited in the embodiments of this application.

It should be understood that the terms "system" and "network" are often used interchangeably herein. The term "and/or" in this article is only an association relationship to describe the associated objects, indicating that there may be three kinds of relationships. For example, "A and/or B" includes three cases: A exists alone, both A and B exist, and B exist alone. In addition, the character "/" in this document generally indicates that the related objects are in an "or" relationship.

It should be understood that the "instruction/indication" mentioned in the embodiments of this application may be a direct instruction, an indirect instruction, or an associated relationship. For example, if A indicates B, A may directly indicate B, for example, B may be obtained through A; or, A may indicate B indirectly, for example, A indicates C, and B may be obtained through C; or, there may be an association relation between A and B.

In the description of some embodiments of this application, the term "corresponding" may indicate that there is a direct or indirect corresponding relationship between two objects, or may indicate that there is an associated relationship between the two objects, or may indicate that there is an relation of indicating/being indicated, configuring/being configured, or the like.

The cell reselection refers to a process in which a UE in an idle or inactive state selects a better cell to provide services by monitoring the signal quality of a serving cell and neighboring cells.

In some embodiments, the terminal device may acquire cell reselection parameters through a broadcast message. The broadcast message may include, for example, at least one of System Information Blocks (SIB s) 2 to 5.

Optionally, the cell reselection parameters may include, for example, at least one of the following parameters:

an optimal cell range, for example, rangeToBestCell;

a reference signal consolidation threshold, for example, absThreshSS-BlocksConsolidation; if the optimal cell range (rangeToBestCell) is configured, the reference signal consolidation threshold is used for indicating a minimum threshold corresponding to a beam used to select the highest ranking cell, and a minimum threshold of a beam used to determine a cell measurement amount; optionally, this parameter in SIB2 is used for a current service frequency point, and this parameter in SIB4 is used for a corresponding inter-frequency frequency point;

a cell reselection priority, for example, cellReselectionPriority, which is used for indicating the absolute priority of NR frequency or E-UTRAN frequency;

a cell reselection sub-priority, for example, cellReselectionSubPriority, which is used for indicating the fractional priority value of NR frequency or E-UTRAN frequency added to the cell reselection priority;

a high-priority measurement relaxation indication, for example, highPriorityMeasRelax, which is used for indicating whether measurement relaxation is allowed to be performed on high-priority frequency points (in the case where measurement relaxation conditions are met);

the number of beams available for reselection in the highest ranking cell, e.g. nrofSS-BlocksToAverage; if the optimal cell range (rangeToBestCell) is configured, nrofSS-BlocksToAverage is used for indicating the number of beams used to select the highest ranking cell, and the number of beams used to determine the cell measurement amount; optionally, this parameter in SIB2 is used for the current service frequency point, and this parameter in SIB4 is used for the corresponding inter-frequency frequency point;

an offset between cells, for example, $Q_{offset_{s,n}}$, which is used for indicating the offset between two cells;

a frequency offset of the same frequency point priority, for example, $Q_{offsetfrequency}$, which is used for indicating the frequency-specific offset of NR frequency points with equal priority;

a hysteresis value, for example, $Q_{hyst}$, which indicates the hysteresis value used for the sorting criterion (or R criterion);

an extra offset for cell selection or reselection, for example, $Q_{offsettemp}$, which is used for indicating the extra offset for cell selection or reselection;

a minimum quality level, for example, $Q_{qualmin}$, which is used for indicating the minimum quality level required by the cell, and the unit is dB;

a minimum reception level, for example, $Q_{rxlevmin}$, which is used for indicating the minimum reception level required by the cell, and the unit is dBm;

a minimum quality level offset, for example, $Q_{qualminoffsetcell}$, which is used for indicating an offset of the quality level of the cell relative to the minimum quality level $Q_{qualmin}$;

a minimum reception level offset, for example, $Q_{rxlevminoffsetcell}$, which is used for indicating an offset of the reception level of the cell relative to the minimum reception level.

Hereinafter, the cell reselection measurement criterion and the cell reselection criterion related to some embodiments of this application are briefly described.

Cell Reselection Measurement Criterion

The cell measurement may include intra-frequency measurement and inter-frequency or inter-RAT (Radio Access Technology) measurement.

1. Intra-Frequency Measurement

Specifically, UE can obtain the cell reselection parameters related to the intra-frequency measurement through a broadcast message, such as the intra-frequency measurement start threshold, where the intra-frequency measurement start threshold includes an intra-frequency reference signal receiving power (RSRP) threshold (i.e., $S_{intraserachP}$) and an intra-frequency reference signal receiving quality (RSRQ) threshold (i.e., $S_{intraserachQ}$).

UE may determine whether to start the intra-frequency measurement according to the measurement result of the serving cell in combination with the intra-frequency measurement start threshold.

For example, UE may not start the intra-frequency measurement when the measurement result of the serving cell does not meet the intra-frequency measurement start threshold. Otherwise, UE starts the same-frequency measurement.

Optionally, the measurement result of the serving cell does not meet the intra-frequency measurement start threshold may include $S_{rxlev}>S_{intraserachP}$, and $S_{qual}>S_{intraserachQ}$; otherwise, it indicates that the measurement result of the serving cell satisfies the intra-frequency measurement start threshold. Herein, $S_{rxlev}$ represents the RSRP related measurement result of the serving cell, for example, $S_{rxlev}$ is equal to Qrxlevmeas–Qrxlevmin, where Qrxlevmeas represents the RSRP of the serving cell, Qrxlevmin may be, for example, –128 dBm; and $S_{qual}$ represents the RSRQ related measurement result of the serving cell, for example, $S_{qual}$ is equal to Qqualmeas–Qqualmin, where Qqualmeas represents the RSRQ of the serving cell, and Qqualmin may be, for example, –60.

2. Inter-Frequency and Inter-RAT Measurement

Specifically, cell reselection parameters related to inter-frequency or inter-RAT measurement, for example, the inter-frequency measurement start threshold, may be obtained through a broadcast message, where the inter-frequency measurement start threshold includes inter-frequency RSRP threshold (i.e., $S_{nonintrasearchP}$) and inter-frequency RSRQ threshold (i.e., $S_{nonintraserachQ}$).

UE may determine whether to start the inter-frequency or inter-RAT measurement according to the measurement result of the serving cell, the reselection priority of frequency points in combination with the inter-frequency measurement start threshold.

For example, measurements are always performed for inter-frequency frequency points or inter-RAT frequency points with a reselection priority higher than that of the current frequency point.

For another example, for inter-frequency frequency points or inter-RAT frequency points whose reselection priority is lower than or equal to the reselection priority of the current frequency point, the measurement is performed according to the following rules.

If the measurement result of the serving cell does not meet the inter-frequency measurement start threshold, the inter-frequency or inter-RAT measurement is not started. Otherwise, the inter-frequency or inter-RAT measurements is started.

Optionally, the measurement result of the serving cell does not meet the inter-frequency measurement start threshold may include $S_{rxlev}>S_{nonintraserachP}$ and $S_{qual}>S_{nonintraserachQ}$; otherwise, it indicates that the measurement result of the serving cell meets the inter-frequency measurement start threshold. Herein, $S_{rxlev}$ represents the RSRP related measurement result of the serving cell, for example, $S_{rxlev}$ is equal to Qrxlevmeas–Qrxlevmin, where Qrxlevmeas represents the RSRP of the serving cell, Qrxlevmin may be, for example, –128 dBm; and $S_{qual}$ represents the RSRQ related measurement result of the serving cell, for example, $S_{qual}$ is equal to Qqualmeas–Qqualmin, where Qqualmeas represents the RSRQ of the serving cell, and Qqualmin may be, for example, –60.

Cell Reselection Criterion

If there are, among the high-priority cells, multiple neighboring cells that meet the conditions, the optimal cell on the high-priority frequency points is selected. For the frequency points with the same priority, the cell reselection may be performed according to the R criterion for the intra-frequency cell reselection.

For example, for cell reselection of high-priority cells, the following conditions need to be met.

1. UE resides in the original cell for more than a certain time, for example, 1 s.

2. If a first threshold (e.g., $Thresh_{X, HighQ}$, or referred to as high-priority reselection threshold) is broadcast, the S value (e.g., Squal) corresponding to the cell of the high-priority frequency point is greater than the first threshold ($Thresh_{X, HighQ}$); or, if $Thresh_{X, HighQ}$ is not broadcast, the S value (e.g., Srxlev) corresponding to the cell of the high-priority frequency point is greater than the second threshold ($Thresh_{X, HighP}$).

3. The duration of the S value corresponding to the cell on the high-priority frequency point exceeds the reselection time parameter (e.g., $Treselection_{RAT}$).

For another example, for cell reselection of low-priority frequency points, the following conditions must be met.

1. UE resides in the serving cell for more than a certain time, for example, 1 s.

2. No cell with high-priority (or equal priority) frequency points meets the re-selection requirements.

3. If a third threshold (e.g., $Thresh_{Serving, LowQ}$, or referred to as low-priority reselection threshold for serving frequency points) is broadcast, the S value (e.g., Squal) of the serving cell is less than the third threshold, and the S value of the cell on the low-priority frequency point is greater than a fourth threshold (e.g., $Thresh_{X, LowQ}$, or referred to as low-priority reselection threshold). Alternatively, if $Thresh_{Serving, LowQ}$ is not broadcast, the S value of the serving cell (e.g., Srxlev) is less than a fifth threshold (e.g., $Thresh_{Serving, LowP}$), and the S value (e.g., Srxlev) of the cell with low-priority frequency is greater than a sixth threshold (e.g., $Thresh_{X, LowP}$).

4. The duration of the S value corresponding to the cell on the low-priority frequency point exceeds the reselection time parameter (e.g., $Treselection_{RAT}$).

It should be understood that the cell reselection measurement criterion and cell reselection criterion as described above are only examples, and may also be modified or adjusted with the evolution and development of communication technologies. So this application is not limited thereto.

It can be seen that in the cell reselection, the signal quality of cells is mainly used as the judgment condition, and the cell reselected based thereon is the cell with good signal quality. However, after the introduction of network slices, different cells may support different network slices. The service transmitted by the terminal device may require the cell to support a specific network slice. In this case, if only the signal quality of cells is considered for cell reselection, a cell that does not support the network slice service required by the terminal may be reselected, thereby affecting the service transmission of the terminal.

FIG. 2 is a schematic flowchart of a method 200 for cell reselection according to some embodiments of this application. The method 200 may be executed by the terminal device in the communication system shown in FIG. 1, and as shown in FIG. 2, the method 200 may include at least some of the following contents.

In S210, the terminal device performs cell reselection according to first information; where the first information includes at least one of: network slice information of the terminal device, frequency point priority information, and channel quality information of at least one cell, the frequency point priority information is used for indicating priority information of a frequency point or a cell, and the at least one cell includes a serving cell and/or a neighboring cell of the terminal device.

It should be understood that some embodiments of this application may be applicable to cell reselection scenarios, and optionally, may also be applicable to other cell selection scenarios, such as cell selection and cell handover scenarios, and the like. In specific implementations, selection may be performed based on selection conditions in related art in combination with the technical solutions of the embodiments of this application. For the sake of brevity, details are not repeated here.

Optionally, in some embodiments of this application, the channel quality information of the cell may be a parameter related to the measurement result of the cell, such as a quality level or a reception level of the cell. As a specific example, the channel quality information of the cell may be represented by the S value of the cell, and the S value may be, for example, Squal or Srxlev. The measurement result may be, for example, but not limited to at least one of the following: Channel Quantity Indicator (CQI), Reference Signal Receiving Power (RSRP), Reference Signal Receiving Quality (RSRQ), and Signal to Interference plus Noise Ratio (SINR).

Optionally, in some embodiments, the network slice information of the terminal device is the network slice information required by the terminal device, the network slice information supported by the terminal device, or network slice information selected by the terminal device, or preconfigured network slice information, or network slice information allowed for the terminal device, or network slice information registered by the terminal device, or network slice information expected by the terminal device.

In other embodiments, the network slice information of the terminal device is a union of at least two of: the network slice information supported by the terminal device, the network slice information selected by the terminal device, the network slice information allowed for the terminal device, the network slice information expected by the terminal device, the network slice information registered by the terminal device, and the preconfigured network slice information.

In still other embodiments, the network slice information of the terminal device is an intersection of at least two of: the network slice information supported by the terminal device, the network slice information selected by the terminal device, the network slice information allowed for the terminal device, the network slice information expected by the terminal device, the network slice information registered by the terminal device and the preconfigured network slice information.

Optionally, the network slice information required, selected or expected by the terminal device may be determined by the terminal device according to at least one of the type of the terminal device, the type of service to be transmitted, or the priority of the network slice, and the like.

Optionally, the preconfigured network slice information is network slice information preconfigured on the terminal device. For example, the preconfigured network slice information may be preconfigured network slice information supported by the terminal device, or preconfigured network slice information corresponding to a service type supported by the terminal device, and the like.

Optionally, the network slice information allowed for the terminal device may be configured by the network device or preconfigured.

Optionally, the network slice information registered by the terminal device may be a network slice registered during the network registration process.

Optionally, in some embodiments, the network slice information of the terminal device includes at least one of the following:
identification information of a network slice, such as at least one of slice ID, single network slice selection assistance information (S-NSSAI) and network slice selection assistance information (NSSAI), and network slicing ID;
frequency point information corresponding to a network slice, or referred to as the frequency layer;
cell information corresponding to a network slice;
priority information corresponding to a network slice;
weight information corresponding to a network slice;
priority information of a frequency point corresponding to a network slice;
weight information of a frequency point corresponding to a network slice.

Optionally, for different network slices, at least one of the corresponding frequency point information, cell information, priority information, and weight information may be different or the same, or may be partially the same.

Optionally, for different network slices, the corresponding frequency point may be different, and/or the frequency point priority information of at least one frequency point corresponding thereto may also be different/or partially different.

Optionally, for different network slices, the corresponding frequency point may be different, and/or the frequency point weight information of at least one frequency point corresponding thereto may also be different/or partially different.

Optionally, the frequency point information or cell information corresponding to the network slice may indicate a frequency point or a cell that supports the network slice, or a frequency point or a cell that has the capability of supporting the network slice service. When performing cell reselection, considering the frequency point or cell corresponding to the network slice is beneficial to reselect the frequency point or cell that supports the network slice service required by the terminal device, thereby improving user experience.

In some embodiments of this application, a first network slice set is constituted by the network slices indicated by the identification information of network slice in the network slice information of the terminal device, and the first network slice set may be expressed as the required network slice required by the terminal device. The priority corresponding to the network slice may refer to the priority corresponding to the network slice in the first network slice set, and the weight information corresponding to the network slice may refer to the weight corresponding to the network slice in the first network slice set.

Optionally, in some embodiments, the priority information corresponding to the network slice of the terminal device may be configured by the network device, or may also be determined by the terminal device, which is not limited in this application.

In some embodiments, the terminal device may acquire priority information corresponding to the network slice of the terminal device from the core network. For example, the terminal device may acquire priority information corresponding to multiple network slices through a non-access stratum (NAS) message, and further determine the priority information corresponding to the network slice in the first network slice set in combination with the network slice information of the terminal device.

In some other embodiments, the terminal device may determine the priority information corresponding to the network slice of the terminal device according to its own interests, service requirements of the terminal device and other information. For example, the terminal device may determine its most interesting network slice as the network slice with the highest priority, or determine the network slice supporting the service to be transmitted as the network slice with the highest priority, or the like.

Optionally, in some embodiments, the weight information of the network slice of the terminal device may be configured by the network device, or may also be determined by the terminal device, which is not limited in this application.

In some embodiments, the terminal device may acquire the weight information of multiple network slices from the serving cell. For example, the weight information of the multiple network slices may be acquired through a broadcast message or a dedicated signaling. Further, the weight information corresponding to the network slice in the first network slice set may be determined according to the weight information of the multiple network slices and the network slice information of the terminal device.

Optionally, the weight information of the multiple network slices may be applicable to the serving cell, or may also be applicable to the serving cell and a neighboring cell.

In some other embodiments, the terminal device may obtain the weight information of the network slice of the terminal device from the core network. For example, the terminal device may obtain the weight information corresponding to multiple network slices through a NAS message, and further determine the weight information corresponding to the network slice in the first network slice set according to the weight information corresponding to the multiple network slices.

In some other embodiments, the terminal device may determine the weight information of the network slice of the terminal device by itself. For example, the terminal device may determine the weight information corresponding to the network slice in the first network slice set. For example, the terminal device may determine its most interesting network slice as the network slice with the highest weight, or determine the network slice supporting the service to be transmitted as the network slice with the highest weight, or the like.

Optionally, in some other embodiments, the frequency point information, cell information, weight information or priority information corresponding to the network slice of the terminal device may also be preconfigured. This application is not limited thereto.

When the terminal device performs cell reselection, based on the information including the cell, frequency point, priority information or weight information corresponding to the network slice required by itself, it is conducive to reselection to a cell or a frequency point that supports the network slice required by the terminal device, so as to ensure the normal transmission of the network slicing service and improve user experience.

In some embodiments, the network device may provide service for the serving cell, and the terminal device may obtain information on network slices supported by the serving cell from the serving cell. For example, the terminal device may obtain the information on the network slices supported by the serving cell through a system broadcast message or a radio resource control (RRC) signaling, where the RRC signaling may be, for example, an RRC dedicated signaling. Alternatively, the information on the network slices supported by the serving cell may also be acquired through other messages or signaling, which is not limited in this application.

In some other embodiments, the terminal device may also acquire information on network slices supported by at least one neighboring cell from the serving cell. For example, the terminal device may acquire information on the network slices supported by the at least one neighboring cell through a system broadcast message or an RRC signaling, where the RRC signaling may be, for example, an RRC dedicated signaling. Alternatively, the information on the network slice supported by the at least one neighboring cell may also be acquired through other messages or signaling, which is not limited in this application.

In some other embodiments, the terminal device may also acquire information on network slices supported by the network side from the serving cell. For example, the terminal device may obtain information on the network slices supported by the network side through a system broadcast message or an RRC signaling, where the RRC signaling may be, for example, an RRC dedicated signaling. Alternatively, the information on the network slices supported by the network side may also be acquired through other messages or signaling, which is not limited in this application.

Optionally, the information on the network slices supported by the network side may include information on network slices supported by at least one cell served by the network device, or information on network slices supported by all network devices, or information on network slices supported by network devices on a tracking area (TA) list or in a TA region where the network device is located, or information on network slices supported by network devices under an access and mobility management function (AMF) where the network device is located.

Optionally, in some embodiments, the network slice information supported by the serving cell includes at least one of the following:

identification information of the network slice supported by the serving cell; frequency point information corresponding to the network slice supported by the serving cell;

cell information corresponding to the network slice supported by the serving cell;

priority information corresponding to the network slice supported by the serving cell;

weight information corresponding to the network slice supported by the serving cell;

frequency point priority information of at least one frequency point corresponding to the network slice supported by the serving cell;

weight information of at least one frequency point corresponding to the network slice supported by the serving cell.

Optionally, in some embodiments, the network slice information supported by the neighboring cell includes at least one of the following:

identification information of the network slice supported by the neighboring cell;

frequency point information corresponding to the network slice supported by the neighboring cell;

cell information corresponding to the network slice supported by the neighboring cell;

priority information corresponding to the network slice supported by the neighboring cell;

weight information corresponding to the network slice supported by the neighboring cell;

frequency point priority information of at least one frequency point corresponding to the network slice supported by the neighboring cell;

weight information of at least one frequency point corresponding to the network slice supported by the neighboring cell.

Optionally, for the definition of the network slice information of the serving cell and the neighboring cell, reference may be made to the relevant definition of the network slice information of the terminal device, which is not repeated here for brevity.

Optionally, the serving cell may indicate priority information corresponding to multiple network slices through a broadcast message or a dedicated message. The priority information corresponding to the multiple network slices may be applicable to the serving cell, or may also be applicable to the serving cell and a neighboring cell. In some other embodiments, the priority information corresponding to the multiple network slices may be preconfigured.

Optionally, the priority information corresponding to the network slice supported by the serving cell may be determined according to the priority information corresponding to the multiple network slices and the identification information of the network slice supported by the serving cell. Or, the priority information corresponding to the network slice supported by the neighboring cell may also be determined according to the priority information corresponding to the multiple network slices and the identification information of the network slice supported by the neighboring cell.

Optionally, in some embodiments, the serving cell may indicate weight information corresponding to multiple network slices through a broadcast message or a dedicated message. The weight information corresponding to the multiple network slices may be applicable to the serving cell, or may also be applied to the serving cell and a neighboring cell. In some other embodiments, the weight information corresponding to the multiple network slices may be preconfigured.

Optionally, the weight information corresponding to the network slice supported by the serving cell may be determined according to the weight information corresponding to the multiple network slices and the identification information of the network slice supported by the serving cell. Or, the weight information corresponding to the network slice supported by the neighboring cell may also be determined according to the weight information corresponding to the multiple network slices and the identification information of the network slice supported by the neighboring cell.

According to the network slice information of the terminal device, in combination with the frequency point information, cell information, priority information or weight information corresponding to the network slice supported by the serving cell and the neighboring cell, it is conducive to reselection to a cell or a frequency point that supports the network slice required by the terminal device, so as to ensure the normal transmission of the network slice service and improve the user experience.

Optionally, the terminal device may also acquire a cell reselection parameter, where the cell reselection parameter includes an evaluation parameter for cell reselection.

In some embodiments, the cell reselection parameter includes the first-type cell reselection parameter, which is not related to network slicing. Optionally, the first-type cell reselection parameter may be obtained from a broadcast message or a dedicated signaling, for example, the dedicated signaling may be RRC dedicated signaling. The first-type reselection parameter may include a cell reselection parameter applicable to the serving cell, or a cell reselection parameter applicable to the serving cell and a neighboring cell.

In some other embodiments, the cell reselection parameter includes a second-type cell reselection parameter, which is related to network slicing. For example, there is at least one group of the second-type cell reselection parameter, with each group of the second-type cell reselection parameter corresponding to one or more network slices. In other words, the second-type cell reselection parameter may be configured per network slice or per group or set of network slices. Alternatively, the at least one group of second-type cell reselection parameter may correspond to at least one network slice or at least one network slice group, that is, the at least one group of second-type cell reselection parameter may correspond to a specific network slice. Alternatively, the at least one group of second-type cell reselection parameter may include a common cell reselection parameter, that is, the at least one group of second-type cell reselection parameter may correspond to all network slices.

Optionally, the second-type cell reselection parameter may be obtained from a broadcast message or a dedicated signaling, for example, the dedicated signaling may be RRC dedicated signaling (e.g., RRC release signaling, RRC reconfiguration signaling, and the like). Alternatively, the second-type cell reselection parameter may also be preconfigured. The second-type reselection parameter may include a cell reselection parameter applicable to the serving cell, or a cell reselection parameter applicable to the serving cell and a neighboring cell.

In some embodiments, when the at least one group of the second-type cell reselection parameter is not configured, the terminal device may perform cell reselection according to the first-type cell reselection parameter. When the at least one group of cell reselection parameter is configured, the terminal device may perform cell reselection according to the at least one group of the second-type cell reselection parameter. Alternatively, when the at least one group of the second-type cell reselection parameter is configured, the terminal device performs cell reselection according to a second-type cell reselection parameter corresponding to a specific network slice. Alternatively, when the at least one group of the second-type cell reselection parameter is configured, and the terminal device performs cell reselection according to a specific network slice, the terminal device may perform cell reselection according to the second-type cell reselection parameter corresponding to the specific network slice. Alternatively, when the at least one group of the second-type cell reselection parameter is configured, the second-type cell reselection parameter is determined by the terminal device to be used according to network indication information, and the terminal device performs cell reselection according to a specific network slice, the terminal device may perform cell reselection according to the second-type cell reselection parameter corresponding to the specific network slice for cell reselection. The specific implementation of the specific network slice will be described below, and will not be repeated here.

According to some embodiments of this application, the second-type cell reselection parameter related to the network slice is configured, and the second-type cell reselection parameter corresponding to the network slice is further used for cell reselection, thereby facilitating the reselection to a cell or a frequency point that meets the cell reselection criterion and supports the network slice required by the terminal device, so as to ensure the normal transmission of the network slice service and improve the user experience.

Embodiments of this application does not limit the specific parameter included in the first-type cell reselection parameter and the second-type cell reselection parameter.

As an example, the first-type cell reselection parameter may include at least one of the cell reselection parameters described in the foregoing embodiments, and the second-type cell reselection parameter may include at least one of the cell reselection parameters described in the foregoing embodiments.

In other words, the first-type cell reselection parameter and the second-type cell reselection parameter may be exactly the same or partially the same as the cell reselection parameters in the broadcast message, which are not limited in this application.

As an example, the first-type cell reselection parameter may include, for example, an optimal cell range (e.g., rangeToBestCell), a reference signal consolidation threshold (e.g., absThreshSS-BlocksConsolidation), and other parameters, which is not limited in this application.

As another example, the second-type cell reselection parameter may include, for example, an optimal cell range (e.g., rangeToBestCell), a reference signal consolidation threshold (e.g., absThreshSS-BlocksConsolidation), and other parameters, which is not limited in this application.

It should be understood that, in some embodiments of this application, when there are multiple beams (or multiple reference signals) in a cell, the signal quality of the cell may be the average value of the signal strengths of multiple reference signals, provided that the signal strength of the reference signal needs to be greater than or equal to the reference signal consolidation threshold. In other words, the signal strength of the reference signal whose signal strength is greater than or equal to the reference signal consolidation threshold can be used in the calculation of the average value. In some cases, if the signal quality of all reference signals is less than the reference signal consolidation threshold, the signal quality of the cell may be determined according to the signal quality of the reference signal with the strongest signal quality.

For convenience of description and illustration, in some embodiments of this application, a beam whose signal strength of a reference signal is to be greater than the reference signal consolidation threshold is called a high-quality beam.

Optionally, in some embodiments, the terminal device may also acquire frequency point priority information. Optionally, the frequency point priority information may include, for example, at least one frequency point or cell and its corresponding frequency point priority.

In some embodiments, the frequency point priority information may be first-type frequency point priority information, which is not related to network slices. Optionally, the first-type frequency point priority information may be obtained from a broadcast message or a dedicated signaling, for example, the dedicated signaling may be an RRC dedicated signaling, or may also be obtained through other messages or signaling, which is not limited therein. The first-type frequency point priority information may be frequency point priority information applicable to the serving cell, or frequency point priority information applicable to the serving cell and a neighboring cell.

Optionally, in some embodiments, the first-type frequency point priority information may include a cell reselection priority and/or a cell reselection sub-priority. It should be noted that the cell reselection priority and cell reselection sub-priority described here are not related to network slices, and the definitions of the cell reselection priority and the cell reselection sub-priority may refer to the relevant descriptions above, which will not be repeated here.

In some other embodiments, the frequency point priority information may be second-type frequency point priority information, and the second-type frequency point priority information may include a frequency point or cell (which may be one, or more than one) corresponding to at least one network slice and frequency point priority information corresponding thereto.

Optionally, in some embodiments, the second-type frequency point priority information may be obtained from a broadcast message or a dedicated signaling, and the dedicated signaling may be, for example, a cell reselection or redirection information element (IE) in the RRC release message; or may also be obtained through other messages or signaling, which is not limited in this application.

Optionally, in some embodiments, the second-type frequency point priority information may include cell reselection priority and/or cell reselection sub-priority. It should be noted that the cell reselection priority and cell reselection sub-priority here are related to the network slice, and the definitions of the cell reselection priority and the cell reselection sub-priority may refer to the relevant descriptions above, which will not be repeated here.

Optionally, when the second-type frequency point priority information is not configured, the terminal device may perform cell reselection according to the first-type frequency point priority information. When the second-type frequency point priority information is configured, the terminal device may perform cell reselection according to the second-type frequency point priority information. Alternatively, when the second-type frequency point priority information is configured, and the terminal device performs cell reselection according to a specific network slice, the terminal device may perform cell reselection according to the second-type frequency point priority information corresponding to the frequency points of the specific network slice. Alternatively, when the second-type frequency point priority information is configured, and the terminal device determines to use the second-type frequency point priority information according to the network indication information, the terminal device may perform cell reselection according to the second-type frequency point priority information corresponding to the frequency points of the specific network slice. The specific implementation of the specific network slice will be described below, and will not be repeated here.

In some embodiments of this application, by configuring the second-type frequency point priority information related to the network slice, when performing cell reselection, the cell reselection is further performed based on the second-type frequency point priority information corresponding to the network slice, thereby facilitating to the reselection to a cell or frequency point that satisfies the cell reselection criterion and supports the network slice required by the terminal device, so as to ensure the normal transmission of the network slice service and improve the user experience.

In some embodiments of this application, the terminal device may perform cell reselection according to at least one of network slice information, frequency point priority information of the terminal device, channel quality of the cell, and quality of beams in the cell. That is, the first information may include at least one item of the above information. It should be understood that the quality of the beam may be determined according to the quality of the reference signal corresponding to the beam.

It should be understood that, in some embodiments of this application, when performing cell reselection according to the above-mentioned various kinds of information, this application does not limit the order of using them. The above-mentioned various kinds of information may also be used in an interspersed manner, or only a part of them may for cell reselection. This application is not limited thereto.

Optionally, when the terminal device performs cell reselection according to at least one of the network slice information, the frequency point priority information of the terminal device, the channel quality of cells, and the quality of beams in the cell, at least one of the following steps may be included.

In step A, the terminal device performs cell reselection according to the network slice information of the terminal device.

In step B, the terminal device performs cell reselection according to the frequency point priority information.

In step C, the terminal device performs cell reselection according to the channel quality of cells.

In step D, the terminal device performs cell reselection according to the quality of beams in the cell.

In other words, the step of performing cell reselection may include all the above steps, or may include only part of the steps, for example, only step A, step B or step C.

It should be understood that this application does not limit the execution order of the above steps.

As an example, step A may precede at least one of step B, step C, and step D.

As another example, step A may follow at least one of step B, step C, and step D.

As yet another example, step A follows step B and precedes at least one of steps C and D.

As yet another example, step A follows at least one of steps B and C and precedes step D.

Hereinafter, an implementation manner of cell reselection according to some embodiments of this application will be described with reference to specific embodiments.

In embodiment 1, the terminal device first determines the priority of the frequency points, that is, whether it is intra-frequency cell reselection or inter-frequency or inter-RAT cell reselection. The cell reselection is further performed based on the network slice information of the terminal device and the channel quality the cells.

It should be understood that, in practical applications, the step of determining the frequency point priority may not exist or may be an implicit step, but the frequency point priority information is considered when sorting cells, which is not limited in this application.

It should be noted that when performing cell reselection based on the network slice information of the terminal device and the channel quality of cells, whether the cell reselection is performed firstly based on the network slice information of the terminal device, or firstly based on the channel quality of cells, or based on both the two pieces of information, is not limited in this application.

Scenario 1 refers to the intra-frequency cell reselection scenario.

In embodiment 1-1, step A is performed first, and step C is further performed.

Specifically, the terminal device may first determine, according to the network slice information of the terminal device and/or the network slice information supported by neighboring cells, a first candidate cell set that satisfies the network slice condition, and further determine a target cell for reselection based on channel quality information of candidate cells in the first candidate cell set.

Optionally, in some embodiments, the network slice condition may include at least one of the following:
  a specific network slice of the terminal device is supported;
  a number of supported network slices of the terminal device is the greatest;
  a network slice with a largest weight value among supported network slices of the terminal device;
  a sum of weight values corresponding to multiple supported network slices of the terminal device is the largest.

Optionally, in some embodiments, the specific network slice includes at least one of the following:
  any network slice in the network slice information of the terminal device;
  a network slice with the highest priority among network slices of the terminal device;
  a network slice with the highest priority supported by the serving cell;
  a network slice supported by the serving cell matching a network slice of the terminal device and having a highest priority.

In other words, the target cell needs to support the specific network slice in the first network slice set, or support the largest number of network slices in the first network slice set, or support the number of network slices in the first network slice set being greater than a certain threshold, or support the network slice with the largest weight in the first network slice set, or support multiple network slices in the first network slice set and a sum of weights of the multiple network slices is the largest.

It should be understood that the network slice condition and the specific network slices exemplified above are only examples, which may be adjusted according to actual needs and is not limited in this application.

Optionally, in some embodiments, the terminal device may determine the target cell according to the channel quality information of the candidate cells in the first candidate cell set in combination with the optimal cell range or the first cell range.

In some embodiments, if the optimal cell range, that is, rangeToBestCell, is not configured, the terminal device may determine the target cell according to the channel quality information of the candidate cells in the first candidate cell set and the first cell range.

In some other embodiments, if the optimal cell range, that is, rangeToBestCell, is configured, the terminal device may determine the target cell according to the channel quality information of the candidate cells in the first candidate cell set and the optimal cell range or the first cell range.

Optionally, the first cell range may be preconfigured or determined by the terminal device.

Optionally, the first cell range may be based on a specific cell in the first candidate cell set, and the specific cell may be, for example, a candidate cell with the highest ranking, a neighboring cell with the highest ranking and the largest number of high-quality beams, or a neighboring cell with the highest ranking and supporting a certain network slice, and the like. The target cell may be a cell whose R value is within a certain range of the R value of the specific cell, and the certain range may be the first cell range.

Optionally, the optimal cell range may be based on a specific cell in the first candidate cell set, and the specific cell may be, for example, a candidate cell with the highest ranking, a neighboring cell with the highest ranking and the largest number of high-quality beams, or a neighboring cell with the highest ranking and supporting a certain network slice, and the like. The target cell may be a cell whose R value is within a certain range of the R value of the specific cell, and the certain range may be the optimal cell range.

Optionally, in some other embodiments, the terminal device may also directly determine the candidate cell with the highest ranking in the first candidate cell set as the target cell, regardless of whether the rangeToBestCell is configured or not.

In embodiment 1-2, step C is performed first, and step A is then performed.

Specifically, the terminal device may first determine a first candidate cell set whose channel quality satisfies a certain condition according to channel quality information of at least one neighboring cell; further determine a second candidate cell set that satisfies the network slice condition according to the network slice information supported by the candidate cells in the first candidate cell set and the network slice information of the terminal device; and then determine a target cell for reselection in the second candidate cell set. For the network slice condition, reference can be made to the relevant description of embodiment 1-1, and details are not repeated here.

Optionally, in some embodiments, the terminal device may determine the first candidate cell set according to the channel quality information of at least one neighboring cell in combination with the optimal cell range or the first cell range.

In some embodiments, if the optimal cell range, that is, rangeToBestCell, is not configured, the terminal device may determine the first candidate cell set according to the channel quality information of the at least one neighboring cell and the first cell range.

In some other embodiments, if the optimal cell range, that is, rangeToBestCell, is configured, the terminal device may determine the first candidate cell set according to the channel quality information of the at least one neighboring cell and the optimal cell range or the first cell range.

Optionally, the first cell range may be preconfigured or determined by the terminal device.

Optionally, the first cell range may be based on a specific cell in the at least one neighboring cell, and the specific cell may be, for example, a neighboring cell with the highest ranking, a neighboring cell with the highest ranking and the largest number of high-quality beams, or a neighboring cell with the highest ranking and supporting a certain network slice, and the like. The target cell may be a cell whose R value is within a certain range of the R value of the specific cell, and the certain range may be the first cell range.

Optionally, the optimal cell range may be based on a specific cell in the at least one neighboring cell, and the specific cell may be, for example, a candidate cell with the highest ranking, a neighboring cell with the highest ranking and the largest number of high-quality beams, or a neighboring cell with the highest ranking and supporting a certain network slice, and the like. The target cell may be a cell whose R value is within a certain range of the R value of the specific cell, and the certain range may be the optimal cell range.

Optionally, in the above embodiments, when the target cell is determined in the first candidate cell set, if the first candidate cell set includes only one cell, the one cell may be determined as the target cell. Alternatively, if the candidate cell set includes multiple cells, the terminal device may perform selection further based on other information. The other information may be, for example, the weight information of the network slice, the priority information of the network slice, the number of high-quality beams, the channel quality, the network slice information of the terminal device, and the like. For example, a cell that satisfies at least one of the following conditions is determined as the target cell: the one that supports the network slice with the largest weight, the one with the largest sum of weights of the supported network slices, the one with the largest number of high-quality beams, or the one with the best channel quality (i.e., with the highest ranking).

In other words, after performing steps C and A, or after performing steps A and C, other steps may be further performed for further selection, for example, at least one of step D, step A and step C is performed.

In embodiment 1-3, step C is performed first, then step D is performed, and step A is further performed.

The terminal device may first determine a first candidate cell set whose channel quality satisfies a certain condition according to the channel quality information of at least one neighboring cell; further determine a second candidate cell set according to the signal quality of reference signal corresponding to the candidate cells in the first candidate cell set in combination with the reference signal consolidation threshold; then determine a third candidate cell set that satisfies the network slice condition according to the network slice information supported by the candidate cells in the second candidate cell set and the network slice information of the terminal device; and determine a target cell for reselection in the third candidate cell set. For the network slice condition, reference can be made to the relevant description of embodiment 1-1, and details are not repeated here.

Optionally, in some embodiments, the terminal device may determine the first candidate cell set according to the channel quality information of the candidate cells in the first candidate cell set and in combination with the optimal cell range or the first cell range. For the specific implementation manner, reference can be made to the relevant description of embodiment 1-1, which will not be repeated here. Alternatively, in some other embodiments, the terminal device may also determine at least one cell with relatively high ranking in the first candidate cell set as the first candidate cell set.

Optionally, determining the second candidate cell set according to the signal quality of the reference signals corresponding to the candidate cells in the first candidate cell set and the reference signal consolidation threshold may include:

determining a candidate cell with the largest number of high-quality beams in the first candidate cell set as the second candidate cell set, or determining a candidate cell with the number of high-quality beams greater than a certain threshold in the first candidate cell set as the second candidate cell set.

Further, when the target cell is determined in the third candidate cell set, if the third candidate cell set includes only one cell, the one cell may be determined as the target cell. Alternatively, if the third candidate cell set includes multiple cells, the terminal device may further perform selection based on other information. The other information may be, for example, the weight information of the network slice, the priority information of the network slice, the number of high-quality beams, the channel quality, the network slice information of the terminal device, and the like. For example, a cell that satisfies at least one of the following conditions is determined as the target cell: the one that supports the network slice with the largest weight, the one with the largest sum of weights of supported network slices, the one with the largest number of high-quality beams, or the one with the best channel quality (i.e., with the highest ranking).

In other words, after step C, step D, and step A are performed, other steps may be performed for further selection, for example, at least one of step C, step D, and step A is performed.

Hereinafter, an implementation manner of cell reselection is described by way of example.

It should be noted that the network slice conditions exemplified below are only examples, and other network slice conditions described in the foregoing embodiments may be included, for example, supporting a slice with the highest priority, support the greatest weight, or the sum of weights of supported network slices is the greatest. Similar situation applies to the channel quality condition.

In example 1, if rangeToBestCell is not configured, the target cell is the highest ranked cell that supports a specific network slice. For example, the terminal device may first determine the specific network slice, further sort the cells from high to low based on the R criterion, and then determine a cell with relatively high ranking and supporting the specific network slice as the target cell.

In example 2, if rangeToBestCell is not configured, the target cell is the highest ranked cell that supports a specific number of network slices. The terminal device may first sort the cells from high to low based on the R criterion, and determine the cell with relatively high ranking and supporting the specific number of network slices as the target cell.

In example 3, if rangeToBestCell is not configured, the target cell is a cell that supports the largest number of network slices of the terminal device, or supports a specific network slice, or supports a specific number of network slices, and the R value of the target cell is within the first cell range. For example, the terminal device sorts the cells from high to low based on the R criterion, determines the first cell with the highest ranking; determines, according to the R value of the first cell, at least one second cell whose R value is within the first cell range among the R value of the first cell; and determine the target cell in the at least one second cell in combination with the network slice condition. Optionally, if there are multiple cells that meet the condition, the selection may be further performed based on other information, for example, the cell with the highest ranking may be selected as the target cell.

In example 4, if rangeToBestCell is configured, the target cell is a cell that supports the largest number of network slices of the terminal device, or supports a specific number of network slices, and the R value of the target cell is within the rangeToBestCell among the R values of the cells with the highest ranking. For example, the terminal device may first sort the cells from high to low based on the R criterion, determine the first cell(s) with the highest ranking, and then determine at least one second cell according to the R value of the first cell and the rangeToBestCell, the R value of the at least one second cell is within a certain range (rangeToBestCell) among the R value(s) of the first cell(s). Then, the terminal device further determines, in the at least one second cell, a cell that supports the largest number of slices of the terminal device or supports the specific number of network slices as the target cell. Optionally, if there are multiple cells determined, the cell with the largest number of high-quality beams or the cell with the highest ranking may be further selected as the target cell.

In example 5, if rangeToBestCell is configured, the target cell is a cell that supports a specific network slice, and an R value of the target cell is within rangeToBestCell relative to the R value of the highest ranking cell. For example, the terminal device may first sort the cells from high to low based on the R criterion; determine a first cell with the highest ranking; and determine at least one second cell according to the R value of the first cell and the rangeToBestCell, where the R value of the at least one second cell is within a certain range (rangeToBestCell) of the R value of the first cell. Then, a cell supporting the specific network slice in the at least one second cell is further determined as the target cell. Optionally, if there are multiple cells as determined, the cell with the largest number of high-quality beams or the cell with the highest ranking may be further selected as the target cell.

In example 6, if rangeToBestCell is configured, the target cell is a cell that has the largest number of high-quality beams, supports a specific network slice, and has an R value within the rangeToBestCell relative to the R value of the highest ranking cell. For example, the terminal device may first sort the cells from high to low based on the R criterion; determine a first cell with the highest ranking; and determine at least one second cell according to the R value of the first cell and the rangeToBestCell, where the R value of the at least one second cell is within a certain range (rangeToBestCell) of the R value of the first cell. Then, a cell that supports the specific network slice and has the largest number of high-quality beams in the at least one second cell is further determined as the target cell.

In example 7, if rangeToBestCell is configured, the target cell is a cell that has the largest number of high-quality beams, supports a certain number of network slices, and has an R value within the rangeToBestCell relative to the R value of the highest ranking cell. For example, the terminal device may first sort the cells from high to low based on the R criterion; determine the first cell with the highest ranking; and determine at least one second cell according to the R value of the first cell and the rangeToBestCell, where the R value of the at least one second cell is within a certain range (rangeToBestCell) of the R value of the first cell. Then, a cell supporting a specific number of network slices and having the largest number of high-quality beams in the at least one second cell is further determined as the target cell.

In example 8, if rangeToBestCell is configured, the target cell may be a cell that has the largest number of high-quality beams, supports the largest number of network slices, and has an R value within the rangeToBestCell relative to the R value of the highest ranking cell. For example, the terminal device may first sort the cells from high to low based on the R criterion; determine the first cell with the highest ranking; and determine at least one second cell according to the R value of the first cell and the rangeToBestCell, where the R value of the at least one second cell is within a certain range (rangeToBestCell) of the R value of the first cell. Then, a cell that supports the largest number of network slices and has the largest number of high-quality beams in the at least one second cell is further determined as the target cell.

In example 9, if rangeToBestCell is configured, the target cell is a cell that has the largest number of high-quality beams, and has an R value within the rangeToBestCell relative to the R value of the highest ranking cell. For example, the terminal device may first sort the cells from high to low based on the R criterion; determine the first cell with the highest ranking; and determine at least one second cell according to the R value of the first cell and the rangeToBestCell, where the R value of the at least one second cell is within a certain range (rangeToBestCell) of the R value of the first cell. Then, a third cell with the largest number of supported network slices is further determined in the at least one second cell. If there is one third cell, the third cell may be determined as the target cell. Alternatively, if there are multiple third cells, a cell that satisfies at least one of the following conditions among the multiple third cells may be determined as the target cell: the highest ranking, supporting a specific network slice, or supporting the largest number of network slices.

In example 10, if rangeToBestCell is configured, the terminal device first sorts the cells from high to low based on the R criterion; determines the first cell with the highest ranking; determines at least one second cell within a certain range (rangeToBestCell) of the R value of the first cell; and further determines a third cell with the largest number of high-quality beams in the at least one second cell. If there are multiple third cells, optionally, the terminal device may select the cell with the highest ranking among them (referred to as the fourth cell) as the target cell. Alternatively, according to the R value of the fourth cell, at least one fifth cell within a certain range of the R value of the fourth cell may be determined, and a cell that supports a specific network slice of the terminal device in the at least one fifth cell is further determined as the target cell. Alternatively, if there are multiple cells determined based on the above conditions, a cell with the highest ranking may be selected as the target cell.

In example 11, if rangeToBestCell is configured, the terminal device first sorts the cells from high to low based on the R criterion; determines the first cell with the highest ranking; determines at least one second cell within a certain range (rangeToBestCell) of the R value of the first cell; and further determining a third cell with the largest number of high-quality beams in the at least one second cell. If there are multiple third cells, optionally, the terminal device may determine the cell with the highest ranking among them (referred to as the fourth cell); determine at least one fifth cell within a certain range of the R value of the fourth cell; and further determine, in the at least one fifth cell, a cell that supports a specific number of network slices of the terminal device or a cell that supports the largest number of network slices as the target cell. Alternatively, if there are multiple cells determined based on the above conditions, a cell with the highest ranking may be selected as the target cell.

To sum up, the network slice supported by the target cell determined based on the cell reselection method according to some embodiments of this application can satisfy the aforementioned network slice conditions, and the channel quality of the target cell satisfies certain channel quality conditions, such as the highest ranking of channel quality, the largest number of high-quality beams in the cells, the number of high-quality beams in the cell being greater than a certain threshold, or the like.

Scenario 2 refers to the inter-frequency or inter-RAT cell reselection scenario.

In case 1, the frequency point priority of the neighboring cell is higher than the frequency point priority of the serving cell.

In this case, the terminal device may also perform cell reselection according to the cell reselection sequence as described above.

Optionally, in this case, the channel quality of the target cell determined by the terminal device satisfies the first channel condition, and the network slice supported by the target cell satisfies the network slice condition.

Herein, for the specific implementation of the network slice condition, reference may be made to the relevant descriptions of the foregoing embodiments, which are not repeated here for brevity.

Optionally, the first channel quality condition includes:
a first threshold (e.g., $Thresh_{X, HighQ}$) is configured on the terminal device, and the channel quality of the neighboring cell is greater than the first threshold (e.g., $Thresh_{X, HighQ}$); or
the first threshold (e.g., $Thresh_{X, HighQ}$) is not configured on the terminal device, and the channel quality of the neighboring cell is greater than a second threshold (e.g., $Srxlev > Thresh_{X, HighP}$).

In case 2, the frequency point priority of the neighboring cell is lower than the frequency point priority of the serving cell.

In this case, the terminal device may also perform cell reselection according to the cell reselection sequence described above.

Optionally, in this case, the channel quality of the target cell determined by the terminal device and the serving cell satisfies the second channel condition, and the network slice supported by the target cell satisfies the network slice condition.

Herein, for the specific implementation of the network slice condition, reference may be made to the relevant descriptions of the foregoing embodiments, which are not repeated here for brevity.

Optionally, the second channel quality condition includes:
a third threshold (e.g., $Thresh_{Serving, LowQ}$) is configured on the terminal device, the channel quality of the serving cell is less than the third threshold (e.g., $Squal < Thresh_{Serving, LowQ}$), and the channel quality of the neighboring cell is greater than a fourth threshold (e.g., $Squal > Thresh_{x, LowQ}$); or
the third threshold is not configured on the terminal device, the channel quality of the serving cell is less than a fifth threshold ($Srxlev < Thresh_{Serving, LowP}$), and the channel quality of the neighboring cell is greater than a sixth threshold (e.g., $Srxlev > Srxlev > Thresh_{x, LowP}$).

It should be understood that during cell reselection, in addition to that the channel quality of the cell needs to meet a certain channel quality condition, the duration of the channel quality of the cell also needs to be greater than a certain threshold, such as a reselection time parameter (e.g., $Treselection_{RAT}$).

In embodiment 2, the network slice condition for cell reselection is determined according to the network slice information of the terminal device, and the cell reselection is further performed according to the frequency point priority and the channel quality of the cell.

With reference to the specific implementation of determining the network slice condition for cell reselection according to the network slice information of the terminal device, reference may be made to the relevant description in embodiment 1, and details are not repeated here.

It should be understood that, in some embodiments of this application, when cell reselection is performed according to the priority of the frequency point, if the network slice condition to be satisfied is determined at this time, the network slice condition includes that a specific network slicing needs to be supported, and the terminal device is configured with the second-type frequency point priority information, the terminal device can perform cell reselection according to the second-type frequency point priority information corresponding to the specific network slice.

For the specific cell reselection process, reference may be made to the relevant description of embodiment 1, which is not repeated here for brevity.

Therefore, in some embodiments of this application, the terminal device can perform cell reselection evaluation based on the network slice information of the terminal device, the frequency point priority information and the channel quality of the cell, which is conducive to reselection to a cell or frequency point that supports the network slice required by the terminal device, thereby ensuring the normal transmission of the network slice service and improving the user experience.

The cell reselection method according to some embodiments of this application is described in detail above with reference to FIG. 2 from the perspective of the terminal device, and the cell reselection method according to some other embodiment of this application is described in detail below with reference to FIG. 3 from the perspective of the network device. It should be understood that the description on the side of the network device corresponds to the description on the side of the terminal device, and similar descriptions can be referred to above, which are not repeated here to avoid repetition.

FIG. 3 is a schematic flowchart of a method 300 for cell reselection according to some other embodiments of this application. The method 300 may be executed by the network device in the communication system shown in FIG. 1. As shown in FIG. 3, the method 300 includes the following steps.

In S310, the network device sends second information to the terminal device, where the second information is used for indicating information related to a network slice, and the second information is used for the terminal device to perform cell reselection.

Optionally, in some embodiments, the second information includes at least one of the following:
identification information of a network slice supported by a serving cell of the terminal device;
priority information of a network slice supported by the serving cell;
weight information of a network slice supported by the serving cell;
identification information of a network slice supported by at least one neighboring cell of the terminal device;
priority information of a network slice supported by the at least one neighboring cell;
weight information of a network slice supported by the at least one neighboring cell;
second-type frequency point priority information, including priority information of at least one frequency point or cell corresponding to at least one network slice;
at least one group of second-type cell reselection parameter related to a network slice.

Optionally, each group of the second-type cell reselection parameter corresponds to one or more network slices; or
the at least one group of second-type cell reselection parameter corresponds to at least one network slice or network slice group; or
the at least one group of second-type cell reselection parameter corresponds to all network slices.

Optionally, the network device sends the second information through a broadcast message or a dedicated message.

It should be noted that, for the definition of the specific content in the second information, reference may be made to the relevant definition in the method 200, which is not repeated here for brevity.

FIG. 4 is a block diagram of a terminal device according to some embodiments of this application. The terminal device 400 of FIG. 4 includes a processing unit 410.

The processing unit 410 is configured to perform cell reselection according to first information.

The first information includes at least one of: network slice information of the terminal device, frequency point priority information, and channel quality information of at least one cell, where the frequency point priority information is used for indicating priority information of a frequency point or a cell, and the at least one cell includes a serving cell and/or a neighboring cell of the terminal device.

Optionally, in some embodiments, the network slice information of the terminal device is network slice information supported by the terminal device, or network slice information selected by the terminal device, or preconfigured network slice information, or network slice information allowed for the terminal device, or network slice information registered by the terminal device, or network slice information expected by the terminal device; or
the network slice information of the terminal device is a union of at least two of: the network slice information supported by the terminal device, the network slice information selected by the terminal device, the network slice information allowed for the terminal device, the network slice information expected by the terminal device, the network slice information registered by the terminal device, and the preconfigured network slice information; or
the network slice information of the terminal device is an intersection of at least two of: the network slice information supported by the terminal device, the network slice information selected by the terminal device, the network slice information allowed for the terminal device, the network slice information expected by the terminal device, the network slice information registered by the terminal device and the preconfigured network slice information.

Optionally, in some embodiments, the network slice information of the terminal device includes at least one of the following:
identification information of a network slice;
frequency point information corresponding to a network slice;
cell information corresponding to a network slice;
priority information corresponding to a network slice;
weight information corresponding to a network slice.

Optionally, the first information further includes network slice information supported by the serving cell and/or network slice information supported by the neighboring cell.

Optionally, the network slice information supported by the serving cell includes at least one of the following:
- identification information of a network slice supported by the serving cell;
- frequency point information corresponding to a network slice supported by the serving cell;
- cell information corresponding to a network slice supported by the serving cell;
- priority information corresponding to a network slice supported by the serving cell;
- weight information corresponding to a network slice supported by the serving cell.

Optionally, in some embodiments, the network slice information supported by the neighboring cell includes at least one of the following:
- identification information of a network slice supported by the neighboring cell;
- frequency point information corresponding to a network slice supported by the neighboring cell;
- cell information corresponding to a network slice supported by the neighboring cell;
- priority information corresponding to a network slice supported by the neighboring cell;
- weight information corresponding to a network slice supported by the neighboring cell.

Optionally, the first information further includes a cell reselection parameter. The cell reselection parameter is a first-type cell reselection parameter or a second-type cell reselection parameter. The first-type cell reselection parameter is not related to any network slice, and includes at least one of cell reselection parameters in a broadcast message. The second-type cell reselection parameter is divided into at least one group, each group of the second-type cell reselection parameter corresponds to one or more network slices, or at least one group of the second-type cell reselection parameter corresponds to at least one network slice or at least one network slice group, or the at least one group of the second-type cell reselection parameter corresponds to all network slices; and the second-type cell reselection parameter includes at least one of the cell reselection parameters in the broadcast message.

Optionally, the broadcast message includes at least one of system information blocks SIB2, SIB3, SIB4 and SIB5.

Optionally, the cell reselection parameters include at least one of the following: an optimal cell range, a reference signal consolidation threshold, a cell reselection priority, a cell reselection sub-priority, a high-priority measurement relaxation indication, available beam numbers for reselection in a highest ranking cell, an offset between cells, a frequency offset for a same frequency point priority, a hysteresis value for R-criterion, an additional offset for cell selection or reselection, a minimum required quality level, a minimum reception level, a reception level offset.

Optionally, in some embodiments, when the terminal device is not configured with the at least one group of second-type cell reselection parameter, the terminal device performs cell reselection according to the first-type cell reselection parameter.

When the terminal device is configured with the at least one group of the second-type cell reselection parameter, the terminal device performs the cell reselection according to the first-type cell reselection parameter or the at least one group of the second-type cell reselection parameter, or performs the cell reselection by using the at least one group of the second-type cell reselection parameter according to an instruction of a network device.

Optionally, in some embodiments, the processing unit 410 is specifically configured to perform following actions:
- performing, by the terminal device, cell reselection according to the network slice information of the terminal device before performing cell reselection according to at least one of: the frequency point priority information, the channel quality information of the at least one cell, and beam quality information in the at least one cell; or
- performing, by the terminal device, cell reselection according to the network slice information of the terminal device after performing cell reselection according to at least one of: the frequency point priority information, the channel quality information of the at least one cell, and the beam quality information in the at least one cell; or
- performing, by the terminal device, cell reselection according to the network slice information of the terminal device after performing cell reselection according to the frequency point priority information and before performing cell reselection according to at least one of the channel quality information of the at least one cell and the beam quality information in the at least one cell; or
- performing, by the terminal device, cell reselection according to the network slice information of the terminal device after performing cell reselection according to at least one of the frequency point priority information and the channel quality information of the at least one cell and before performing cell reselection according to the beam quality information in the at least one cell.

Optionally, in some embodiments, the processing unit 410 is further configured to:
- determine a target frequency point priority of at least one neighboring cell of the terminal device according to the frequency point priority information; and
- perform the cell reselection according to the target frequency point priority of the at least one neighboring cell, the network slice information of the terminal device, and channel quality information of the at least one neighboring cell.

Optionally, in some embodiments, the target frequency point priority of the at least one neighboring cell is the same as the frequency point priority of the serving cell, and the processing unit 410 is further configured to:
- determine a first candidate cell set satisfying a network slice condition according to the network slice information of the terminal device and network slice information supported by the at least one neighboring cell; and
- determine a target cell for reselection according to channel quality information of a candidate cell in the first candidate cell set.

Optionally, in some embodiments, the processing unit 410 is specifically configured to:
- determine a second candidate cell set according to the channel quality information of the candidate cell in the first candidate cell set in combination with an optimal cell range or a first cell range; and
- determine the target cell for reselection according to the second candidate cell set.

Optionally, in some embodiments, when the terminal device is configured with the optimal cell range, the processing unit 410 determines the second candidate cell set according to the optimal cell range.

When the terminal device is not configured with the optimal cell range, the processing unit 410 determines the second candidate cell set according to the first cell range, or determines the second candidate cell set formed by at least one candidate cell with a best channel quality in the first candidate cell set.

Optionally, in some embodiments, the frequency point priority of the at least one neighboring cell is the same as the frequency point priority of the serving cell, and the processing unit 410 is further configured to:
determine a first candidate cell set according to the channel quality information of the at least one neighboring cell;
determine a second candidate cell set satisfying a network slice condition according to network slice information supported by a candidate cell in the first candidate cell set and the network slice information of the terminal device; and
determine a target cell for reselection according to the second candidate cell set.

Optionally, in some embodiments, the processing unit 410 is further configured to:
determine the first candidate cell set according to the channel quality information of the at least one neighboring cell in combination with an optimal cell range or a first cell range.

Optionally, in some embodiments, when the terminal device is configured with the optimal cell range, the processing unit 410 determines the first candidate cell set according to the optimal cell range.

When the terminal device is not configured with the optimal cell range, the processing unit 410 determines the first candidate cell set according to a first cell range, or determines the first candidate cell set formed by at least one candidate cell with a best channel quality.

Optionally, in some embodiments, the processing unit 410 is further configured to:
determine the target cell for reselection in the second candidate cell set according to at least one of:
a reference signal consolidation threshold;
network slice information supported by a candidate cell in the second candidate cell set;
channel quality information of a candidate cell in the second candidate cell set;
a second cell range.

Optionally, in some embodiments, the second cell range is based on a candidate cell with a best channel quality in the second candidate cell set, or based on a candidate cell with a best channel quality and with a largest number of beams satisfying the reference signal consolidation threshold.

Optionally, in some embodiments, the frequency point priority of the at least one neighboring cell is the same as the frequency point priority of the serving cell, and the processing unit 410 is further configured to:
determine a first candidate cell set according to the channel quality information of the at least one neighboring cell;
determine a second candidate cell set according to signal quality of a reference signal of a candidate cell in the first candidate cell set in combination with a reference signal consolidation threshold;
determine a third candidate cell set satisfying a network slice condition according to network slice information supported by a candidate cell in the second candidate cell set and the network slice information of the terminal device; and
determine a target cell for reselection according to the third candidate cell set.

Optionally, in some embodiments, the first cell range is based on a candidate cell with a best channel quality in the first candidate cell set, or based on a candidate cell with a best channel quality and with a largest number of beams satisfying a reference signal consolidation threshold.

Optionally, in some embodiments, the frequency point priority of the at least one neighboring cell is the same as the frequency point priority of the serving cell includes:
frequency points of the at least one neighboring cell and the serving cell are the same; or the frequency points or systems of the at least one neighboring cell and the serving cell are different, but frequency point priorities of the at least one neighboring cell and the serving cell are the same.

Optionally, in some embodiments, the frequency point priority of the at least one neighboring cell is higher than the frequency point priority of the serving cell, and the processing unit 410 is further configured to:
determine, according to the channel quality information of the at least one neighboring cell and network slice information supported by the at least one neighboring cell, a first candidate cell set with a channel quality satisfying a first channel quality condition and a supported network slice satisfying a network slice condition; and
determine a target cell for reselection in the first candidate cell set.

Optionally, in some embodiments, the first channel quality condition includes:
the terminal device is configured with a first threshold, and a channel quality of a neighboring cell is greater than the first threshold; or
the terminal device is not configured with the first threshold, and the channel quality of the neighboring cell is greater than a second threshold.

Optionally, in some embodiments, the frequency point priority of the at least one neighboring cell is lower than the frequency point priority of the serving cell, and the processing unit 410 is further configured to:
determine, according to the channel quality information of the at least one neighboring cell and channel quality information of the serving cell, a second candidate cell set satisfying a second channel quality condition with a supported network slice satisfying a network slice condition; and
determine a target cell for reselection in the second candidate cell set.

Optionally, in some embodiments, the second channel quality condition includes:
the terminal device is configured with a third threshold, a channel quality of the serving cell is smaller than the third threshold, and a channel quality of a neighboring cell is greater than a fourth threshold; or
the terminal device is not configured with the third threshold, the channel quality of the serving cell is smaller than a fifth threshold, and the channel quality of the neighboring cell is greater than a sixth threshold.

Optionally, in some embodiments, the processing unit 410 is further configured to:
determine a network slice condition for cell reselection according to the network slice information of the terminal device; and
perform the cell reselection according to a frequency point priority of the at least one neighboring cell and the channel quality information of the at least one neighboring cell in combination with the network slice condition.

Optionally, in some embodiments, the processing unit 410 is further configured to:
- determine a first candidate cell set with a channel quality satisfying a channel quality condition and a supported network slice satisfying the network slice condition; and
- determine a target cell for reselection in the first candidate cell set.

Optionally, in some embodiments, the network slice supported by the target cell satisfies the network slice condition, and the channel quality of the target cell satisfies the channel quality condition.

Optionally, in some embodiments, the network slice condition includes at least one of the following:
- a certain network slice of the terminal device is supported;
- a number of supported network slices of the terminal device is the greatest;
- a network slice with a largest weight value among network slices of the terminal device is supported;
- a sum of weight values corresponding to multiple supported network slices of the terminal device is the largest.

Optionally, in some embodiments, the specific network slice includes at least one of the following:
- any network slice in the network slice information of the terminal device;
- a network slice with a highest priority among network slices of the terminal device;
- a network slice with a highest priority supported by the serving cell;
- a network slice supported by the serving cell matching a network slice of the terminal device and having a highest priority.

Optionally, in some embodiments, the terminal device 400 further includes:
- a communication unit, configured to acquire priority information of the network slice of the terminal device from a non-access stratum (NAS) message of a core network.

The processing unit 410 is further configured to determine priority information of network slices of the terminal device according to service requirements of the terminal device.

Optionally, in some embodiments, the communication unit is further configured to:
- acquire weight information of the network slice of the terminal device from a NAS message of a core network.

The processing unit 410 is further configured to determine the weight information of network slices of the terminal device according to the service requirements of the terminal device.

Optionally, in some embodiments, the channel quality condition includes at least one of the following:
- a channel quality is ranked the highest;
- a number of beams satisfying a reference signal consolidation threshold in the cell is the largest.

Optionally, in some embodiments, the communication unit is further configured to perform at least one of the following:
- receive priority information of a network slice supported by the serving cell and/or the at least one neighboring cell through a broadcast message or a dedicated message;
- receive weight information of a network slice supported by the serving cell and/or the at least one neighboring cell through a broadcast message or a dedicated message.

Optionally, in some embodiments, the frequency point priority information is first-type frequency point priority information or second-type frequency point priority information, where the first-type frequency point priority information includes priority information of at least one frequency point or cell, and the second-type frequency point priority information includes priority information of at least one frequency point or cell corresponding to at least one network slice.

Optionally, in some embodiments, the second-type frequency point priority information is configured through a broadcast message or an radio resource control (RRC) dedicated signaling, or the second-type frequency point priority information is preconfigured.

Optionally, in some embodiments, when the terminal device is not configured with the second-type frequency point priority information, the processing unit 410 performs cell reselection according to the first-type frequency point priority information.

When the terminal device is configured with the second-type frequency point priority information or based on an instruction of a network device, the processing unit 410 performs the cell reselection according to the second-type frequency point priority information.

Optionally, in some embodiments, the above-mentioned communication unit may be a communication interface or a transceiver, or an input/output interface of a communication chip or a system-on-chip. The aforementioned processing unit may be one or more processors.

It should be understood that the terminal device 400 according to the embodiments of this application may correspond to the terminal device in the method embodiments of this application, and the above-mentioned and other operations and/or functions of the various units in the terminal device 400 are respectively for realizing the method shown in FIG. 2. The corresponding process of the terminal device in 200 is not repeated here for brevity.

FIG. 5 is a block diagram of a network device according to some embodiments of this application. The network device 500 of FIG. 5 includes a communication unit 510.

The communication unit 510 is configured to send second information to a terminal device, where the second information is used for indicating information related to a network slice, and the second information is used for the terminal device to perform cell reselection.

Optionally, in some embodiments, the second information includes at least one of the following:
- identification information of a network slice supported by a serving cell of the terminal device;
- priority information of a network slice supported by the serving cell;
- weight information of a network slice supported by the serving cell;
- identification information of a network slice supported by at least one neighboring cell of the terminal device;
- priority information of a network slice supported by the at least one neighboring cell;
- weight information of a network slice supported by the at least one neighboring cell;
- second-type frequency point priority information, comprising priority information of at least one frequency point or cell corresponding to at least one network slice; at least one group of second-type cell reselection parameter related to a network slice.

Optionally, in some embodiments, each group of the second-type cell reselection parameter corresponds to one or more network slices; or the at least one group of second-type cell reselection parameter corresponds to at least one network slice or network slice group; or the at least one group of second-type cell reselection parameter corresponds to all network slices.

Optionally, in some embodiments, the network device sends the second information through a broadcast message or a dedicated message.

Optionally, in some embodiments, the above-mentioned communication unit may be a communication interface or a transceiver, or an input/output interface of a communication chip or a system-on-chip. The aforementioned processing unit may be one or more processors.

It should be understood that the network device 500 according to the embodiments of this application may correspond to the network device in the method embodiments of this application, and the above-mentioned and other operations and/or functions of each unit in the network device 500 are used for realizing the method shown in FIG. 3 respectively. The corresponding process of the network device in 300 is not repeated here for brevity.

Figure 6:
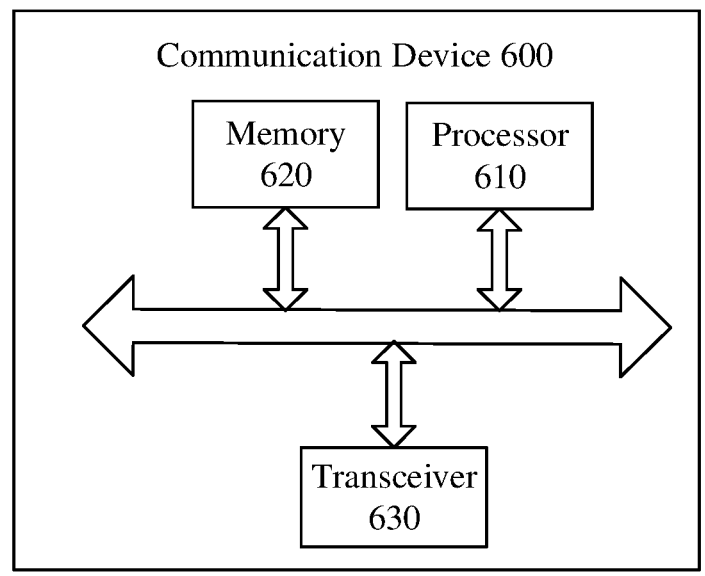
FIG. 6 is a block diagram of a communication device according to some other embodiments of this application.

FIG. 6 is a block diagram of a communication device 600 according to some embodiments of this application. The communication device 600 shown in FIG. 6 includes a processor 610, and the processor 610 is configured to call and run a computer program from a memory, so as to implement the method according to some embodiments of this application.

Optionally, as shown in FIG. 6, the communication device 600 may further include a memory 620. The processor 610 may call and run a computer program from the memory 620 to implement the method according to some embodiments of this application.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices, specifically, may send information or data to other devices, or receive information or data sent by other devices.

In some embodiments, the transceiver 630 may include a transmitter and a receiver. The transceiver 630 may further include an antenna, and the number of the antenna may be one or more.

Optionally, the communication device 600 may specifically be the network device in some embodiments of this application, and the communication device 600 may implement the corresponding processes implemented by the network device in the method according to some embodiments of this application. For the sake of brevity, details are not repeated here.

Optionally, the communication device 600 may specifically be the mobile terminal/terminal device in some embodiments of this application, and the communication device 600 may implement the corresponding processes implemented by the mobile terminal/terminal device in the method according to some embodiments of this application. For the sake of brevity, details are not repeated here.

Figure 7:
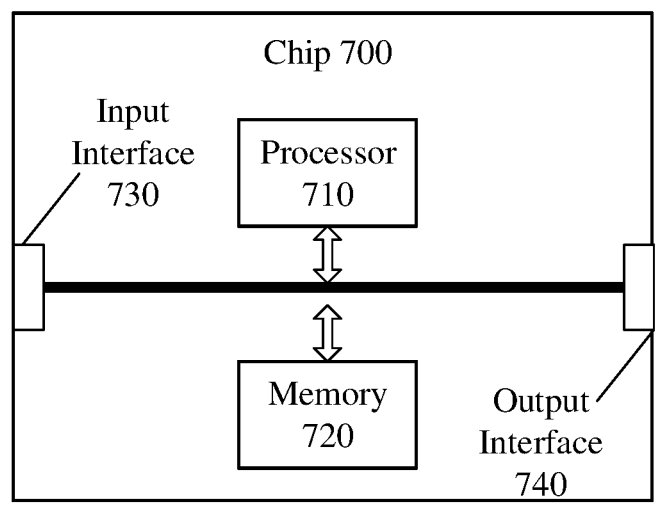
FIG. 7 is a block diagram of a chip according to some embodiments of this application.

FIG. 7 is a block diagram of a chip according to some embodiments of this application. The chip 700 shown in FIG. 7 includes a processor 710, and the processor 710 may call and run a computer program from a memory, so as to implement the method according to some embodiments of this application.

Optionally, as shown in FIG. 7, the chip 700 may further include a memory 720. The processor 710 may call and run the computer program from the memory 720 to implement the methods according to some embodiments of this application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip can be applied to the network device in some embodiments of this application, and the chip can implement the corresponding processes implemented by the network device in the method according to some embodiments of this application, which is not repeated here for brevity.

Optionally, the chip can be applied to the mobile terminal/terminal device in some embodiments of this application, and the chip can implement the corresponding processes implemented by the mobile terminal/terminal device in the method according to some embodiments of this application, which is not repeated here for brevity.

It should be understood that the chip mentioned in the embodiments of this application may also be referred to as a system-level chip, a system chip, a chip system, a system-on-chip, or the like.

Figure 8:
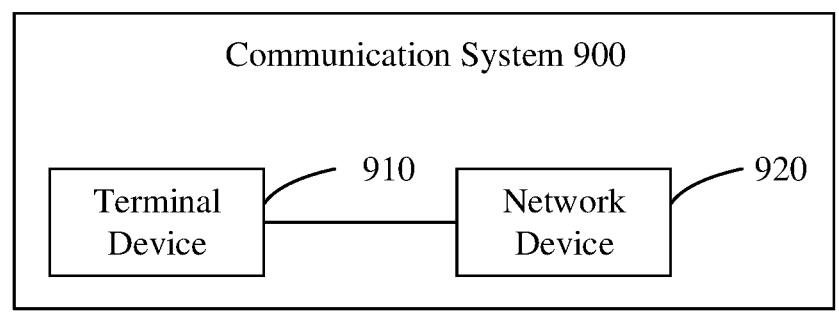
FIG. 8 is a block diagram of a communication system according to some embodiments of this application.

FIG. 8 is a block diagram of a communication system 900 according to some embodiments of this application. As shown in FIG. 8, the communication system 900 includes a terminal device 910 and a network device 920.

The terminal device 910 may be configured to implement the corresponding functions implemented by the terminal device in the above method, and the network device 920 may be configured to implement the corresponding functions implemented by the network device in the above method. For brevity, details are not repeated here.

It should be understood that the processor in some embodiments of this application may be an integrated circuit chip, which has a signal processing capability. In the implementation process, each step of the above method embodiments may be completed by a hardware integrated logic circuit in a processor or an instruction in the form of software. The above-mentioned processor may be a general-purpose processor, a digital signal processor (DSP), an application specific integrated circuit (ASIC), a field programmable gate array (FPGA) or other available programmable logic devices, discrete gate or transistor logic devices, discrete hardware components, which can be configured to implement or execute the methods, steps, and logic block diagrams disclosed in the embodiments of this application. A general-purpose processor may be a microprocessor or the processor may be any conventional processor or the like. The steps of the method disclosed in the embodiments of this application may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory, and the processor reads the information in the memory, and completes the steps of the above method in combination with its hardware.

It can be understood that the memory in some embodiments of this application may be a volatile memory or a non-volatile memory, or may include both volatile and non-volatile memory. Herein, the non-volatile memory may be a read-only memory (ROM), a programmable ROM (PROM), an erasable PROM (EPROM), an electrically EPROM (EEPROM) or flash memory. The volatile memory may be random access memory (RAM), which acts as an external cache. By way of illustration without limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct Rambus RAM (DR RAM). It should be noted that the memory of the systems and methods described herein is intended to include, but not be limited to, these described and any other suitable types of memory.

It should be understood that the above memory is an example but not a limitative description, for example, the memory in some embodiments of this application may also be a static RAM (SRAM), a dynamic RAM (DRAM), synchronous DRAM (SDRAM), double data rate SDRAM (DDR SDRAM), enhanced SDRAM (ESDRAM), synch link DRAM (SLDRAM) and direct Rambus RAM (DR RAM) and so on. In other words, the memory in the embodiments of this application is intended to include, but not limited to, these described and any other suitable types of memory.

Embodiments of this application further provide a computer-readable storage medium for storing a computer program.

Optionally, the computer-readable storage medium may be applied to the network device in some embodiments of this application, and the computer program enables the computer to execute the corresponding processes implemented by the network device in the method according to various embodiments of this application. For brevity, details are not repeated here.

Optionally, the computer-readable storage medium may be applied to the mobile terminal/terminal device in some embodiments of this application, and the computer program enables the computer to execute the corresponding processes implemented by the mobile terminal/terminal device in the method according to various embodiments of this application. For brevity, details are not repeated here.

Embodiments of this application also provide a computer program product, including computer program instructions.

Optionally, the computer program product may be applied to the network device in some embodiments of this application, and the computer program instructions cause the computer to execute the corresponding processes implemented by the network device in the method according to various embodiments of this application. For brevity, details are not repeated here.

Optionally, the computer program product may be applied to the mobile terminal/terminal device in some embodiments of this application, and the computer program instructions cause the computer to execute the corresponding processes implemented by the mobile terminal/terminal device in the method according to various embodiments of this application. For brevity, details are not repeated here.

Embodiments of this application also provide a computer program.

Optionally, the computer program may be applied to the network device in some embodiments of this application. When running on the computer, the computer program causes the computer to execute the corresponding processes implemented by the network device in the method according to various embodiments of this application. For brevity, details are not repeated here.

Optionally, the computer program may be applied to the mobile terminal/terminal device in some embodiments of this application. When running on the computer, the computer program causes the computer to execute the corresponding processes implemented by the mobile terminal/terminal device in the method according to various embodiments of this application. For brevity, details are not repeated here.

Those of ordinary skill in the art can realize that the units and algorithm steps of each example in some embodiments disclosed herein can be implemented in electronic hardware, or a combination of computer software and electronic hardware. Whether these functions are performed in hardware or software depends on the specific application and design constraints of the technical solution. Those of ordinary skill in the art can implement the described functionality using different methods for each particular application, but such implementations should not be considered as going beyond the scope of this application.

Those skilled in the art can clearly understand that, for the convenience and brevity of description, the specific working process of the above-described systems, devices and units may refer to the corresponding processes in the foregoing method embodiments, which will not be repeated here.

In the several embodiments provided in this application, it should be understood that the disclosed system, apparatus and method may be implemented in other manners. For example, the apparatus embodiments described above are only illustrative. For example, the division of the units is only a logical function division. In actual implementation, there may be other division methods. For example, multiple units or components may be combined or integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

The units described as separate components may be or may not be physically separated, and components displayed as units may be or may not be physical units, that is, may be located in one place, or may be distributed to multiple network units. Some or all of the units may be selected according to actual needs to achieve the purpose of the solution in some embodiments.

In addition, each functional unit in each embodiment of this application may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the technical solution of this application can be embodied in the form of a software product in essence or for the part that contributes to the prior art or the part of the technical solution. The computer software product may stored in a storage medium, including several instructions that cause a computer device (which may be a personal computer, a server, a network device, or the like) to execute all or part of the steps of the methods described in the various embodiments of this application. The aforementioned storage medium includes: U disk, mobile hard disk, read-only memory (ROM), random access memory (RAM), magnetic disk or optical disk and other medium that can store program codes.

The above embodiments are only exemplary implementations of this application, but the protection scope of this application is not limited thereto. Those skilled in the art may easily conceive changes or substitutions within the technical scope disclosed in this application, which should be covered by the protection scope of this application. Therefore, the protection scope of this application shall be subject to the protection scope of the claims.

What is claimed is:

1. A method for cell reselection, characterized in comprising:
   performing, by a terminal device, cell reselection according to first information;
   wherein the first information comprises: network slice information of the terminal device, frequency point priority information, and channel quality information of at least one cell, the network slice information of the terminal device is network slice information supported by the terminal device or network slice information selected by the terminal device, the frequency point priority information is used for indicating priority information of a frequency point or a cell, and the at least one cell comprises at least one of a serving cell or a neighboring cell of the terminal device,
   wherein the frequency point priority information is selected from first-type frequency point priority information and second-type frequency point priority information, the first-type frequency point priority information is not related to network slicing and comprises priority information of at least one frequency point or cell, and the second-type frequency point priority information is related to the network slicing and comprises priority information of at least one frequency point or cell corresponding to at least one network slice, and
   wherein the method further comprises:
   performing, by the terminal device, the cell reselection according to the second-type frequency point priority information in response to determining that the second-type frequency point priority information is configured; and
   performing, by the terminal device, the cell reselection according to the first-type frequency point priority information in response to determining that the second-type frequency point priority information is not configured.

2. The method as claimed in claim 1, wherein the network slice information of the terminal device comprises at least one of:
   identification information of a network slice;
   frequency point information corresponding to a network slice;
   cell information corresponding to a network slice;
   priority information corresponding to a network slice; or
   weight information corresponding to a network slice.

3. The method as claimed in claim 1, wherein the first information further comprises at least one of network slice information supported by the serving cell or network slice information supported by the neighboring cell.

4. The method as claimed in claim 1, wherein the first information further comprises network slice information supported by the serving cell, and the network slice information supported by the serving cell comprises at least one of:
   identification information of a network slice supported by the serving cell;
   frequency point information corresponding to a network slice supported by the serving cell;
   cell information corresponding to a network slice supported by the serving cell;
   priority information corresponding to a network slice supported by the serving cell; or
   weight information corresponding to a network slice supported by the serving cell.

5. The method as claimed in claim 1, wherein the first information further comprises network slice information supported by the neighboring cell, and the network slice information supported by the neighboring cell comprises at least one of:
   identification information of a network slice supported by the neighboring cell;
   frequency point information corresponding to a network slice supported by the neighboring cell;
   cell information corresponding to a network slice supported by the neighboring cell;
   priority information corresponding to a network slice supported by the neighboring cell; or
   weight information corresponding to a network slice supported by the neighboring cell.

6. The method as claimed in claim 1, wherein performing, by the terminal device, the cell reselection according to the first information comprises:
   performing, by the terminal device, the cell reselection according to the network slice information of the terminal device before performing cell reselection according to at least one of:
   the frequency point priority information, the channel quality information of the at least one cell, and beam quality information in the at least one cell.

7. The method as claimed in claim 1, wherein performing, by the terminal device, the cell reselection according to the first information comprises:
   determining, by the terminal device, a target frequency point priority of at least one neighboring cell of the terminal device according to the frequency point priority information; and
   performing the cell reselection according to the target frequency point priority of the at least one neighboring cell, the network slice information of the terminal device, and channel quality information of the at least one neighboring cell.

8. The method as claimed in claim 1, further comprising:
   receiving, by the terminal device, priority information of a network slice supported by at least one of the serving cell or the at least one neighboring cell through a broadcast message or a dedicated message.

9. The method as claimed in claim 1, wherein the frequency point priority information is the second-type frequency point priority information, and the second-type frequency point priority information is configured through a broadcast message or an radio resource control (RRC) dedicated signaling.

10. A terminal device, characterized in comprising a processor and a memory, wherein the memory is configured to store a computer program, and the processor, when calling and running the computer program stored in the memory, is configured to:

perform cell reselection according to first information;

wherein the first information comprises: network slice information of the terminal device, frequency point priority information, and channel quality information of at least one cell, the network slice information of the terminal device is network slice information supported by the terminal device or network slice information selected by the terminal device, the frequency point priority information is used for indicating priority information of a frequency point or a cell, and the at least one cell comprises at least one of a serving cell or a neighboring cell of the terminal device, wherein the frequency point priority information is selected from first-type frequency point priority information and second-type frequency point priority information, the first-type frequency point priority information is not related to network slicing and comprises priority information of at least one frequency point or cell, and the second-type frequency point priority information is related to the network slicing and comprises priority information of at least one frequency point or cell corresponding to at least one network slice, and wherein the processor is further configured to:

perform the cell reselection according to the second-type frequency point priority information in response to determining that the second-type frequency point priority information is configured; and perform the cell reselection according to the first-type frequency point priority information in response to determining that the second-type frequency point priority information is not configured.

11. The terminal device as claimed in claim 10, wherein the network slice information of the terminal device comprises at least one of:

identification information of a network slice;
frequency point information corresponding to a network slice;
cell information corresponding to a network slice;
priority information corresponding to a network slice; or
weight information corresponding to a network slice.

12. The terminal device as claimed in claim 10, wherein the first information further comprises at least one of network slice information supported by the serving cell or network slice information supported by the neighboring cell.

13. The terminal device as claimed in claim 10, wherein the first information further comprises network slice information supported by the serving cell, and the network slice information supported by the serving cell comprises at least one of:

identification information of a network slice supported by the serving cell;
frequency point information corresponding to a network slice supported by the serving cell;
cell information corresponding to a network slice supported by the serving cell;
priority information corresponding to a network slice supported by the serving cell; or
weight information corresponding to a network slice supported by the serving cell.

14. The terminal device as claimed in claim 10, wherein the first information further comprises network slice information supported by the neighboring cell, and the network slice information supported by the neighboring cell comprises at least one of:

identification information of a network slice supported by the neighboring cell;
frequency point information corresponding to a network slice supported by the neighboring cell;
cell information corresponding to a network slice supported by the neighboring cell;
priority information corresponding to a network slice supported by the neighboring cell; or
weight information corresponding to a network slice supported by the neighboring cell.

15. The terminal device as claimed in claim 10, wherein the processor is configured to perform the cell reselection according to the network slice information of the terminal device before performing cell reselection according to at least one of: the frequency point priority information, the channel quality information of the at least one cell, and beam quality information in the at least one cell.

16. The terminal device as claimed in claim 10, wherein the processor is configured to determine a target frequency point priority of at least one neighboring cell of the terminal device according to the frequency point priority information; and perform the cell reselection according to the target frequency point priority of the at least one neighboring cell, the network slice information of the terminal device, and channel quality information of the at least one neighboring cell.

17. The terminal device as claimed in claim 10, wherein the processor is further configured to:

receive priority information of a network slice supported by at least one of the serving cell or the at least one neighboring cell through a broadcast message or a dedicated message.

18. A non-transitory computer-readable storage medium used for storing a computer program, wherein the computer program causes a computer to perform cell reselection according to first information;

wherein the first information comprises: network slice information of a terminal device, frequency point priority information, and channel quality information of at least one cell, the network slice information of the terminal device is network slice information supported by the terminal device or network slice information selected by the terminal device, the frequency point priority information is used for indicating priority information of a frequency point or a cell, and the at least one cell comprises at least one of a serving cell or a neighboring cell of the terminal device, wherein the frequency point priority information is selected from first-type frequency point priority information and second-type frequency point priority information, the first-type frequency point priority information is not related to network slicing and comprises priority information of at least one frequency point or cell, and the second-type frequency point priority information is related to the network slicing and comprises priority information of at least one frequency point or cell corresponding to at least one network slice, and wherein the computer program further causes the computer to:

perform the cell reselection according to the second-type frequency point priority information in response to determining that the second-type frequency point priority information is configured; and perform the cell reselection according to the first-type frequency point priority information in response to determining that the second-type frequency point priority information is not configured.

* * * * *